(12) United States Patent  
Reed

(10) Patent No.: US 9,949,558 B2  
(45) Date of Patent: Apr. 24, 2018

(54) ACCESSORY FASTENING DEVICES AND METHODS

(71) Applicant: Chums, Inc., Salt Lake City, UT (US)

(72) Inventor: Scott McMurrin Reed, Park City, UT (US)

(73) Assignee: Chums, Inc., Salt Lake City, UT (US)

( * ) Notice: Subject to any disclaimer, the term of this patent is extended or adjusted under 35 U.S.C. 154(b) by 81 days.

(21) Appl. No.: 14/473,993

(22) Filed: Aug. 29, 2014

(65) Prior Publication Data

US 2016/0058168 A1    Mar. 3, 2016

(51) Int. Cl.

| | |
|---|---|
| *F16B 2/10* | (2006.01) |
| *F16B 2/18* | (2006.01) |
| *A45F 5/02* | (2006.01) |
| *F16B 2/22* | (2006.01) |
| *A45F 5/06* | (2006.01) |

(52) U.S. Cl.  
CPC ............. *A45F 5/02* (2013.01); *A45F 5/021* (2013.01); *A45F 5/06* (2013.01); *F16B 2/185* (2013.01); *F16B 2/22* (2013.01)

(58) Field of Classification Search  
CPC .... F16B 2/185; F16B 2/22; A45F 5/02; A45F 5/021; A45F 5/06  
See application file for complete search history.

(56) References Cited

U.S. PATENT DOCUMENTS

| | | | |
|---|---|---|---|
| 2,506,783 A | 5/1950 | Fauteux | |
| 3,135,034 A | 6/1964 | Fauteux | |
| 4,277,864 A | 7/1981 | Orson, Sr. | |
| 5,410,783 A * | 5/1995 | Stoelinga | B42F 1/02 24/511 |
| 5,655,270 A | 8/1997 | Boisvert | |
| 5,687,458 A | 11/1997 | Coker | |
| D399,650 S | 10/1998 | Lee | |
| 6,010,044 A | 1/2000 | Hsiao | |
| D432,910 S | 10/2000 | Caper | |
| 6,212,688 B1 | 4/2001 | Leslie | |
| 6,256,840 B1 | 7/2001 | Elliott | |
| D478,723 S | 8/2003 | Blanton | |
| 6,631,538 B1 | 10/2003 | Carr | |
| 6,688,505 B1 | 2/2004 | Bradley et al. | |
| 6,694,575 B1 | 2/2004 | Martin | |
| 6,834,784 B1 | 12/2004 | Webber et al. | |
| D523,330 S | 6/2006 | Mattesky | |

(Continued)

OTHER PUBLICATIONS

Reed, Notice of Allowance dated Mar. 23, 2016 for U.S. Appl. No. 14/133,269.

(Continued)

*Primary Examiner* — Jack W Lavinder

(74) *Attorney, Agent, or Firm* — Stoel Rives LLP

(57) ABSTRACT

An accessory fastening device can include a first clamping member having a first clamping surface, a second clamping member having a second clamping surface that faces the first clamping surface, and a locking arm that is rotatable between an unlocked state and a locked state. Rotation of the locking arm to transition the locking arm from the unlocked state to the locked state causes the second clamping surface of the second clamping member to advance toward the first clamping surface of the first clamping member.

19 Claims, 21 Drawing Sheets

(56) References Cited

U.S. PATENT DOCUMENTS

| | | | |
|---|---|---|---|
| 7,174,607 B1 * | 2/2007 | Buettell | A45F 5/00 24/499 |
| 7,213,307 B2 | 5/2007 | Votel | |
| D631,254 S | 1/2011 | Leslie | |
| 8,166,615 B2 * | 5/2012 | Coldiron | A44B 15/005 24/3.11 |
| 2004/0083580 A1 * | 5/2004 | Gerson | A47F 5/0884 24/3.11 |
| 2015/0164206 A1 | 6/2015 | Reed | |

OTHER PUBLICATIONS

Reed, Office Action dated Dec. 8, 2015 for U.S. Appl. No. 14/133,269.

* cited by examiner

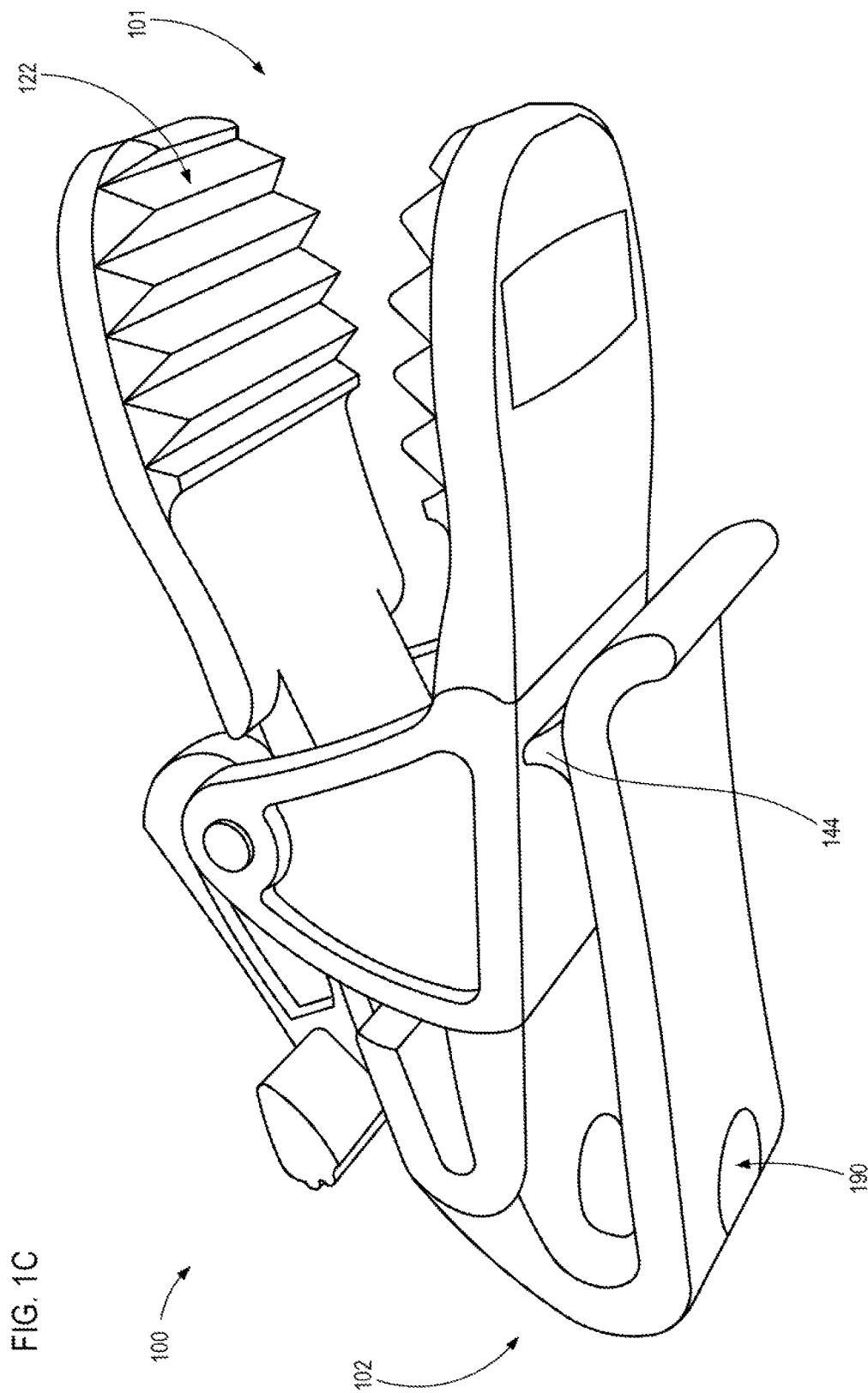

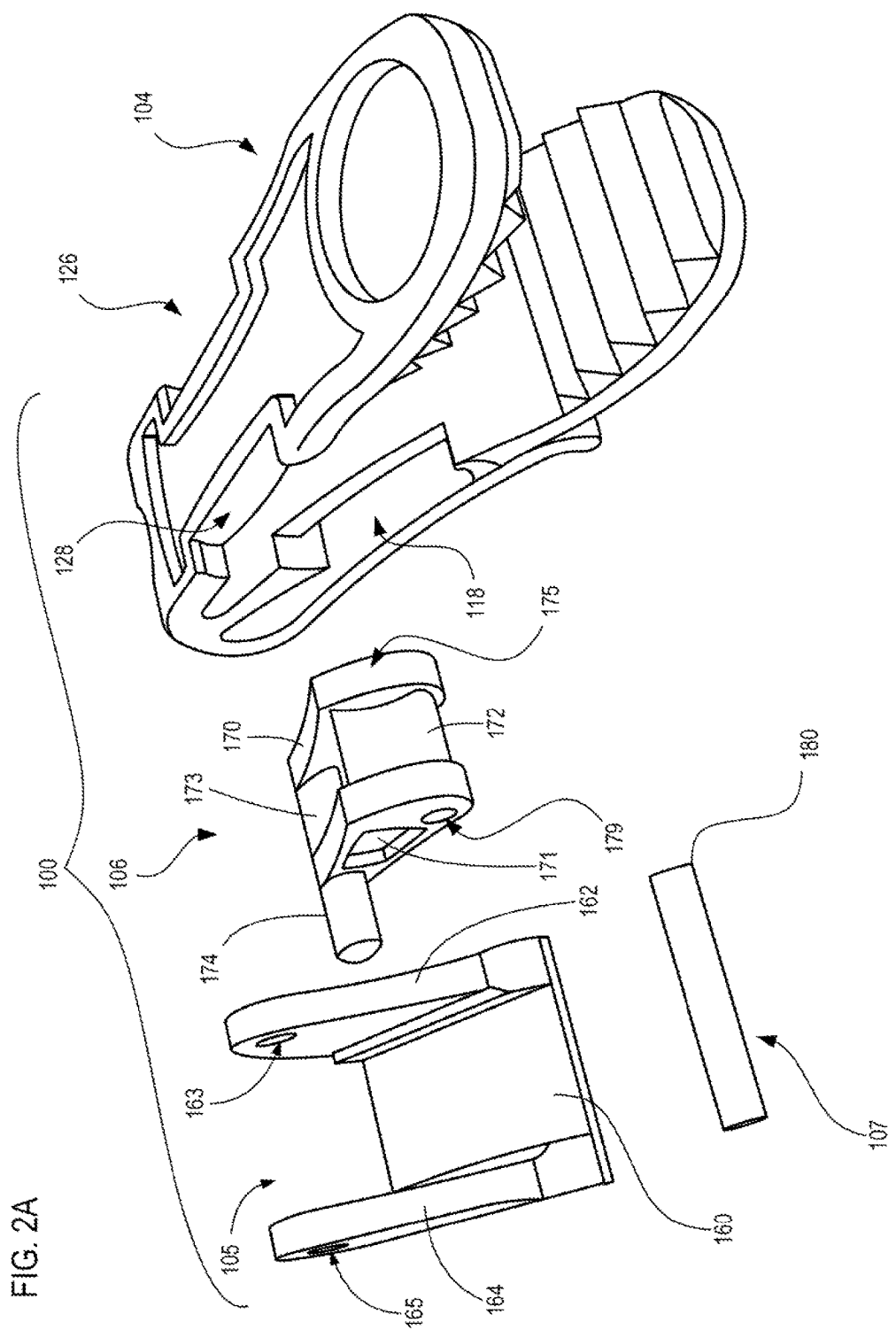

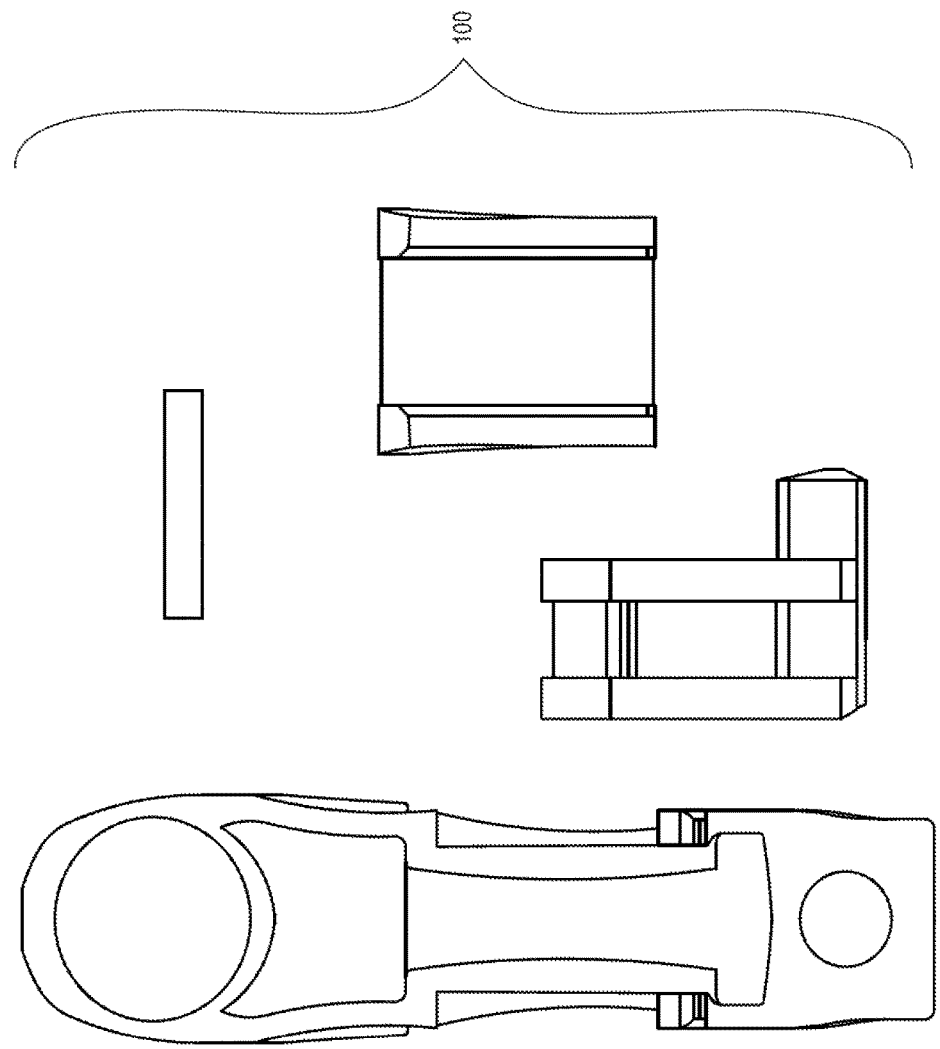

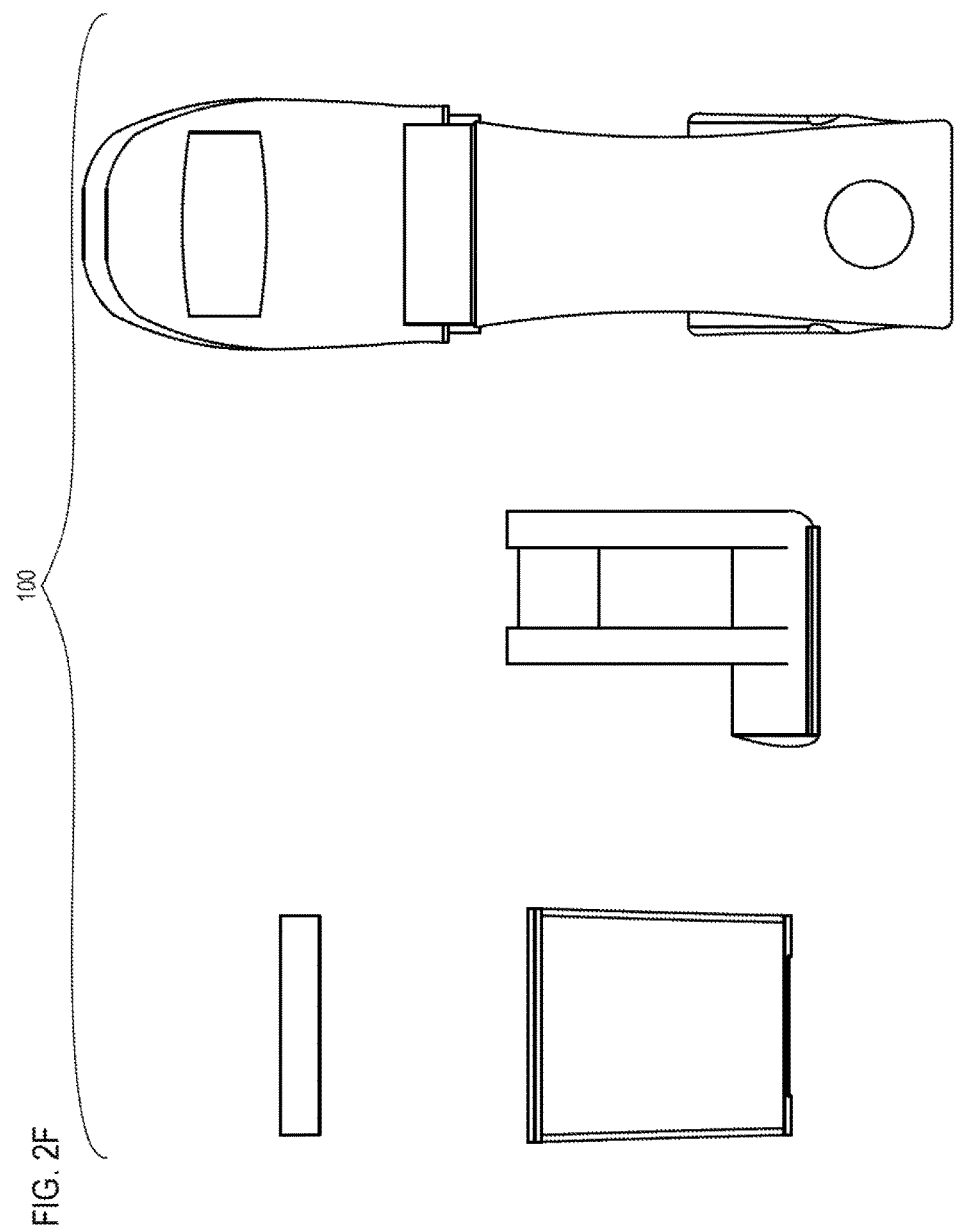

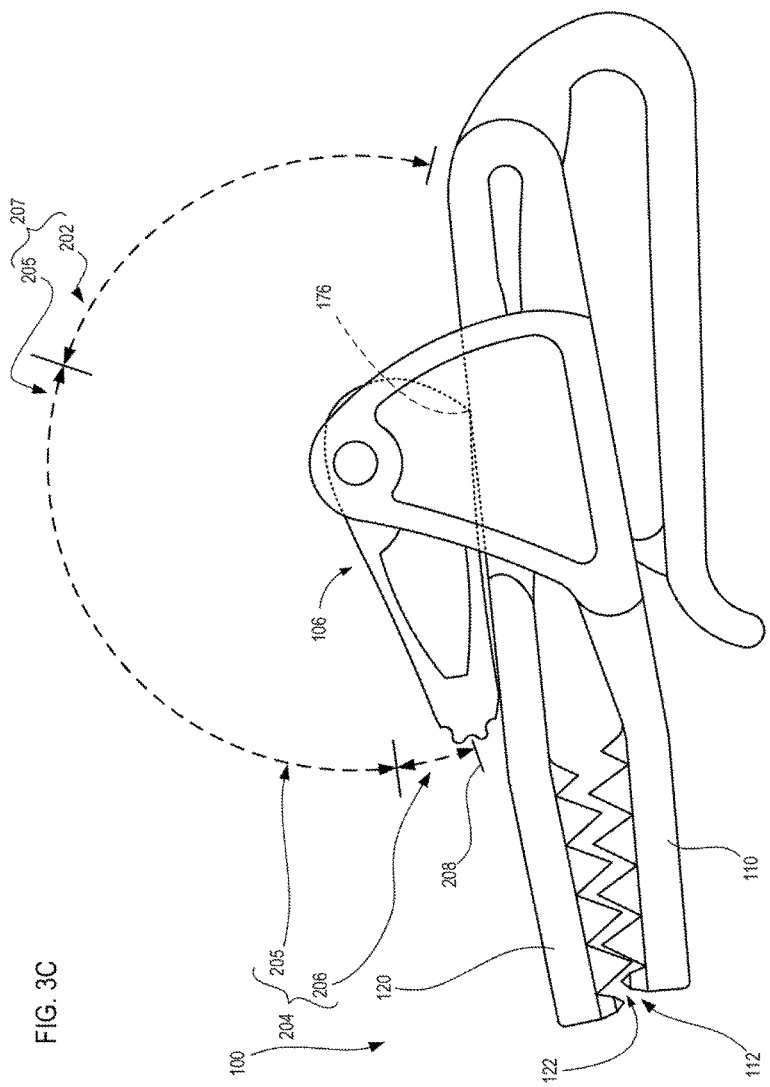

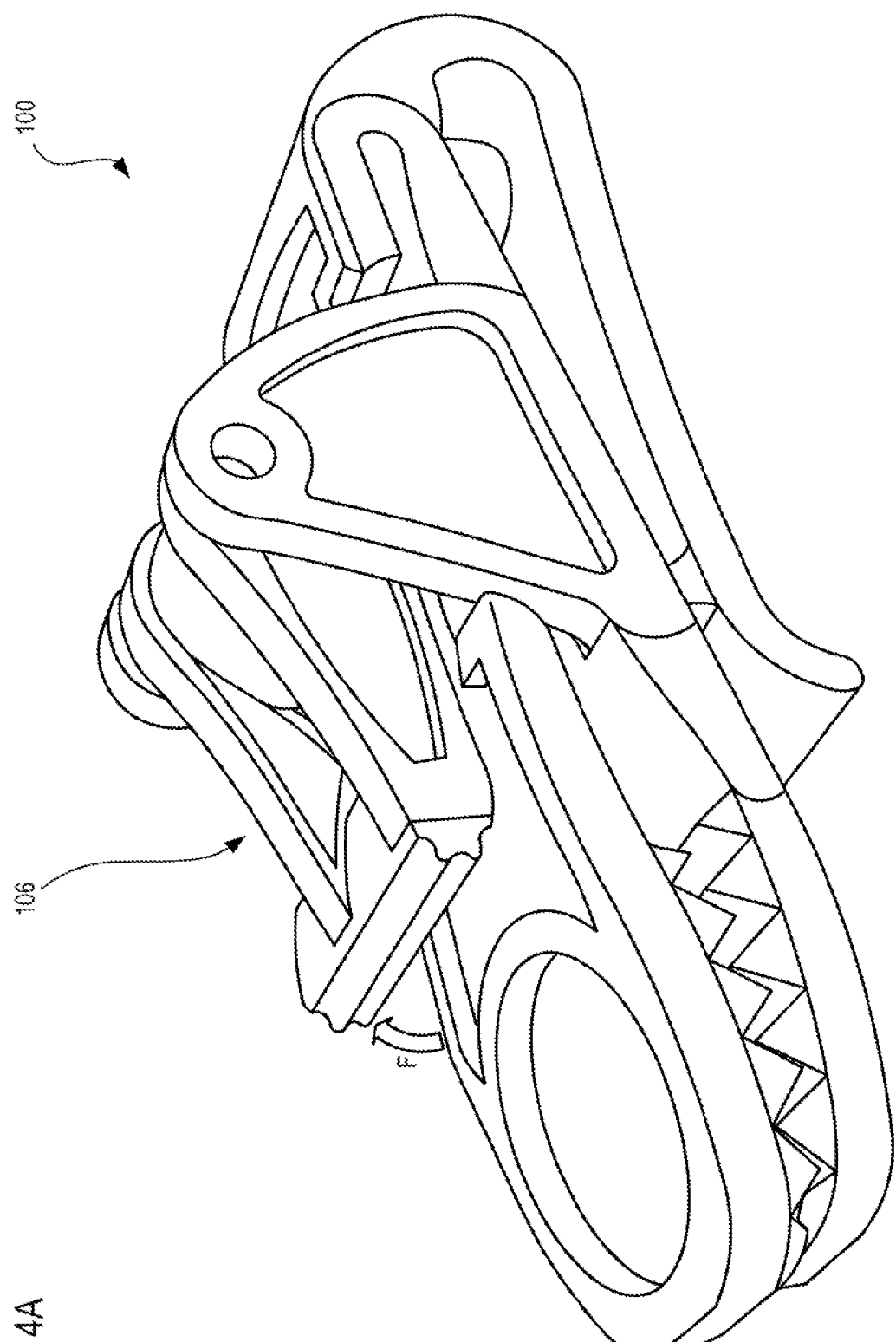

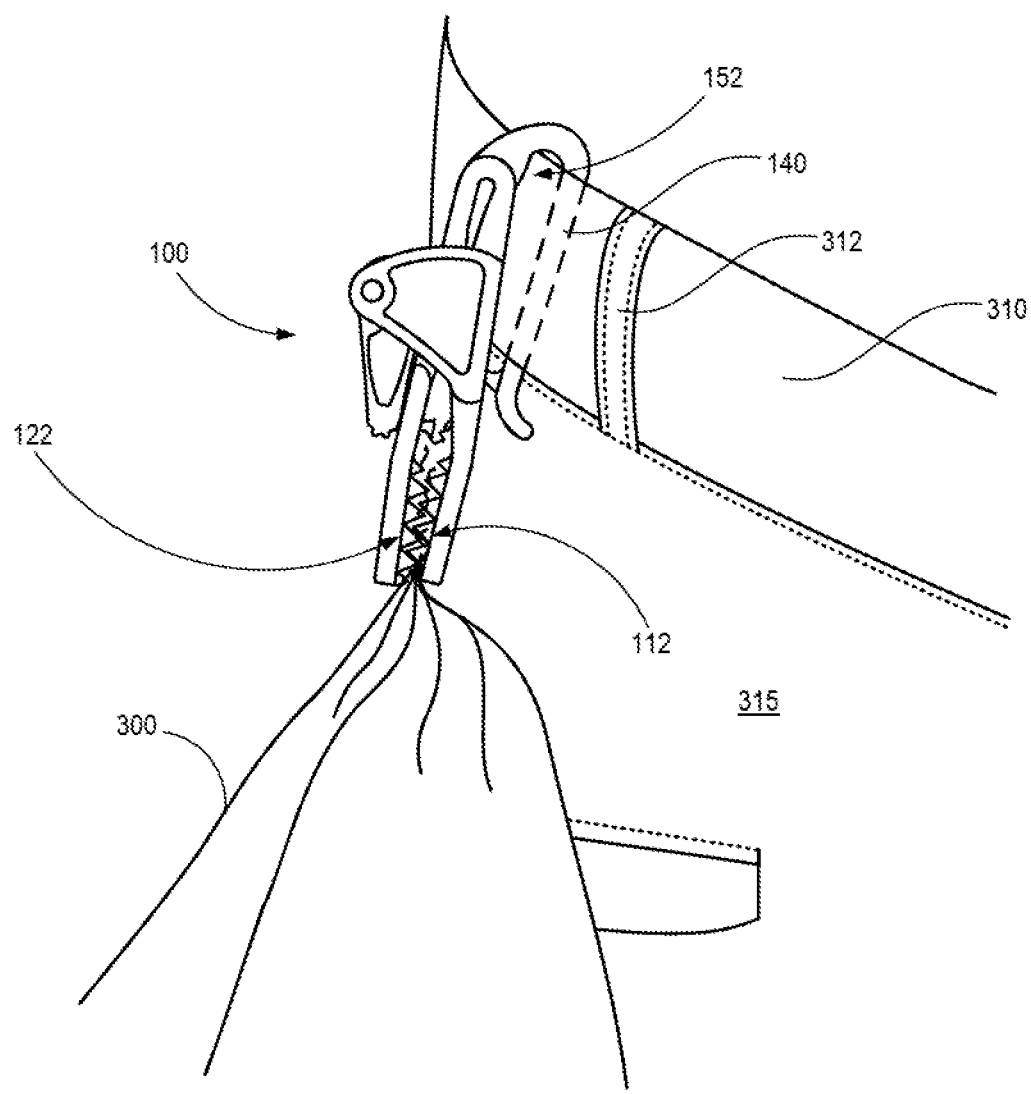

ACCESSORY FASTENING DEVICES AND METHODS

BACKGROUND

This disclosure relates to mechanical devices for fastening accessories to articles of clothing, which can be advantageous relative to other devices in the same field of endeavor. For example, certain embodiments of clip devices for securing personal accessories, such as gloves, to the belt or other article of clothing of a user may have an enhanced ease of use, may provide a more secure attachment to the accessories, or both. Other uses, features, and/or advantages of embodiments of fastening devices will also be apparent from the disclosure.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 1C is a lower perspective view thereof;

FIG. 2A is an exploded upper perspective view of the accessory fastening device;

FIG. 2E is an exploded top plan view thereof;

FIG. 2F is an exploded bottom plan view thereof;

FIG. 3C is a further side elevation view of the accessory fastening device in a locked state, wherein the locking arm has been rotated to a position in which the locking arm maintains the upper clamping member in a displaced state;

FIG. 4A is an upper perspective view of the accessory fastening device in the locked state;

FIG. 5B is an enlarged perspective view of the accessory fastening device of FIG. 5A taken along the view line 5B-5B in FIG. 5A;

Figure 1A:
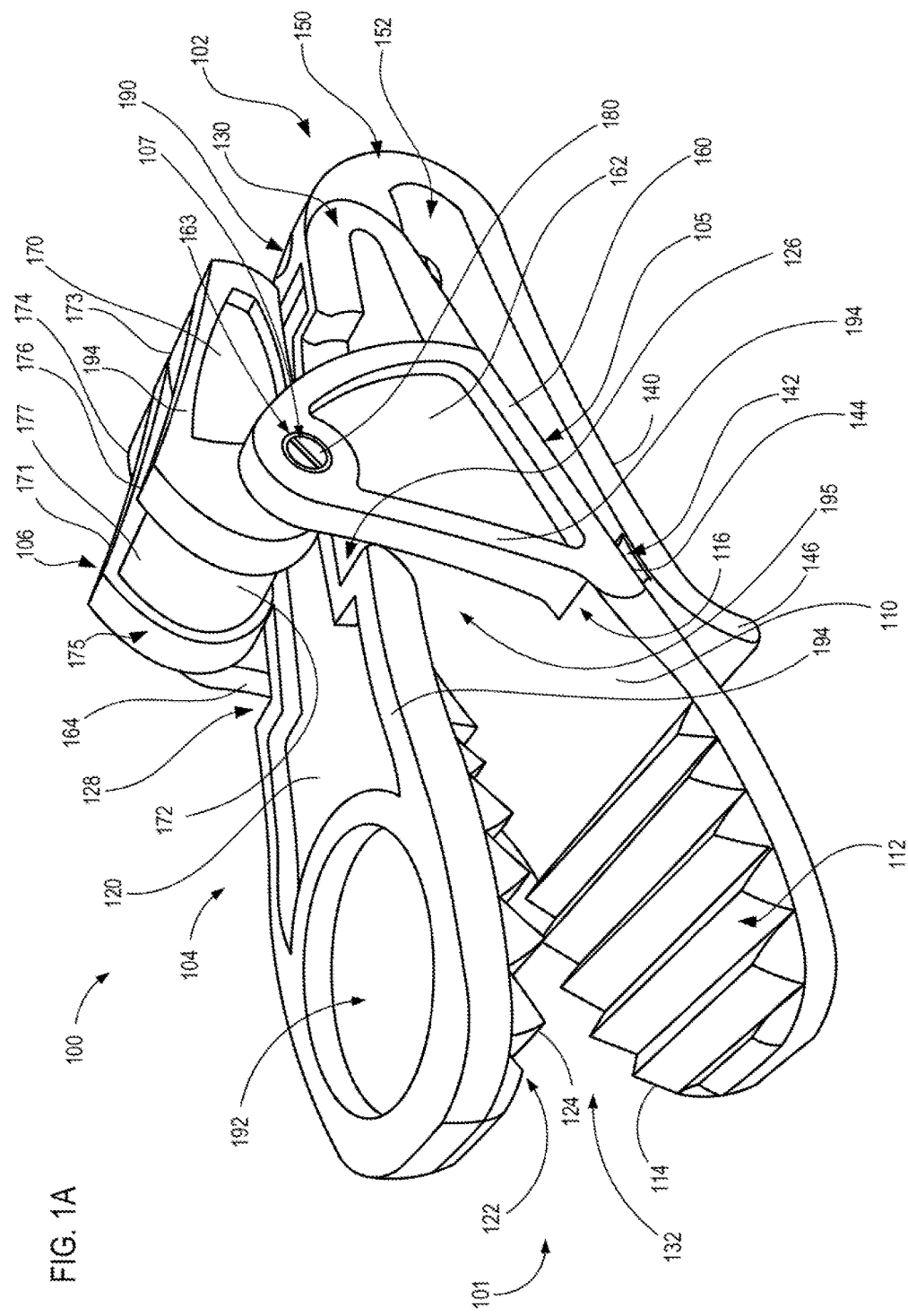
FIG. 1A is an upper perspective view of an embodiment of an accessory fastening device in an open or unlocked state.

References to the figures throughout the description are for convenience only. Embodiments of the devices, systems, and methods described herein may include one or more additional components or features not illustrated in the figures. Similarly, one or more of the illustrated components or features may be omitted and/or substituted for a different component or feature in any of the embodiments described herein. Furthermore, the described features, structures, or characteristics may be combined in any suitable manner in one or more alternative embodiments.

DETAILED DESCRIPTION

Certain embodiments of accessory fastening devices are disclosed. In various embodiments, a device can include a pair of clamping members that cooperate to selectively hold an accessory. In some embodiments, each clamping member includes a clamping or gripping surface, and the respective clamping surfaces can face each other. The clamping surfaces can be positioned apart from one another to define a gap into which the accessory can be received, and the clamping surfaces can be urged into close proximity to each other in order to hold the accessory. In some embodiments, a fastening device includes a rotatable locking arm that is configured to move at least one of the clamping members relative to the other clamping member. The locking arm can be selectively rotated between an unlocked state and a locked state. When in the locked state, the locking arm can retain the clamping members in a position in which the clamping surfaces cooperate to hold the accessory. Various embodiments of the fastening devices can be readily transitioned from the unlocked state to the locked state and/or from the locked state to the unlocked state. Embodiments of the device can securely hold the accessory when the device is in the locked state. One or more of the foregoing features or advantages and/or other or further features or advantages are apparent from the disclosure herein.

FIGS. 1A-1F depict various views of an embodiment of an accessory fastening device 100, which may also be referred to as an accessory holding device or assembly, or which may be referred to simply as the device 100. In these drawings, the device 100 is depicted in an unlocked or non-holding state. In the illustrated embodiment, holding surfaces (which are described further below) are spaced from each other when the device 100 is in the non-holding state such that an accessory can readily be introduced between the holding surfaces. In the illustrated embodiment, the holding surfaces include teeth. The accessory or accessories that may be held by the device 100 can be any suitable accessory, such as, for example, personal protective equipment (PPE), such as one or more gloves, hats, safety glasses, etc., and/or any other suitable accessory, such as wires, tools, keys, etc. In some embodiments, the device 100 may be particularly well suited for gripping one or more gloves.

FIGS. 2A-2F depict various exploded views of the accessory fastening device 100. Stated otherwise, FIGS. 2A-2F depict the device 100 in a disassembled state. In the illustrated embodiment, the device includes four discrete components that are joined into a single assembly, which is shown in FIGS. 1A-1F. The components include a clamping unit 104, which may also be referred to as a clip assembly, a clamp, or a body; a support structure 105, which may also be referred to as a frame or a trestle; a locking arm 106, which may also be referred to as a lock, latch, or handle; and a pivot member 107.

The following discussion is provided with respect to FIGS. 1A-1F as well as FIGS. 2A-2F. The discussion focuses primarily on FIGS. 1A and 2A, although various features may also be identified in others of the drawings.

In the illustrated embodiment, the clamping unit 104 includes a lower clamping member 110 and an upper clamping member 120 that are joined at a connection region 130. When the device 100 is in an open or unclamped state, such as shown in FIGS. 1A-1F, distal ends of the clamping members 110, 120, which are at a distal end 101 of the illustrated device 100, can be separated from each other. Proximal ends of the clamping members 110, 120 can be joined at the connection region 130, which are at a proximal end 102 of the illustrated device 100.

The lower clamping member 110 can include a clamping surface 112, which can be configured to grip or otherwise hold an accessory. Similarly, the upper clamping member 120 can include a clamping surface 122, which can be configured to grip or otherwise hold an accessory. In some embodiments, the gripping surfaces 112, 122 can cooperate with each other to grip or otherwise hold an accessory when the device 100 is in a clamping or locked state. The gripping surfaces 112, 122 can face each other, as shown.

Directional references are made for the sake of convenience and are not intended to be limiting of a particular orientation of the devices. For example, the terms "upper" and "lower" may refer to a particular orientation of a device depicted in the drawings, although that device may be oriented in other manners (e.g., such that the "upper" end is instead a "lower" end of the device, as determined relative to a user, the ground, or any other suitable reference frame).

In the illustrated embodiment, the lower and upper clamping surfaces 112, 122 comprise laterally extending protrusions or teeth 114, 124, respectively, that extend toward each other. The teeth 114, 124 can be offset such that one or more teeth 114 of the lower clamping surface 112 can each be positioned in between a pair of teeth 124 of the upper clamping surface 122, and vice versa, when the device 100 is in the clamping state (see, e.g., FIG. 3C). The illustrated teeth 114, 124 each extend transversely by an amount that is substantially a full width between opposing side edges of the lower and upper clamping members 110, 120. Other arrangements are also possible. For example, the teeth 114, 124 may extend transversely along only a portion of the width of the distal ends of the lower and upper clamping members 110, 120. Moreover, other arrangements of the clamping surfaces 112, 122 are possible. For example, rather than having the substantially triangular cross-section shown in the drawings, the protrusions 114, 124 may have other suitable cross-sections, such as rounded or other suitable shapes. The protrusions 114, 124 may be generally dome-shaped, pyramidal, or have other suitable configuration. In various embodiments, the clamping surfaces 112, 122 can be formed as the same material as other portions of the clamping members 110, 120, or they may be formed of one or more other materials, such as high-friction coatings or layers (e.g., elastomeric boots or pads). Any suitable configuration, coating, or arrangement for the clamping surfaces 112, 114 is contemplated. The clamping surfaces 112, 114 can be configured to grip or otherwise maintain or retain an accessory between them when the device 100 is in a clamping state.

As shown in FIGS. 1A, 1B, 2A, and 2C, in the illustrated embodiment, the lower and upper clamping members 110, 120 define recesses 116, 118 and 126, 128, respectively, for receiving various portions of the support structure 105. The lower recesses 116, 118 can be sized to create a tight fit with a lower end of the support structure 105. In some instances, such a fit can assist in maintaining a solid connection between the lower clamping member 110 and the support structure 105. In some instances, the support structure 105 remains substantially fixed relative to the lower clamping member 110 during operation of the device 100, which operation is discussed further below.

In some embodiments, the upper recesses 126, 128 are sized to remain spaced from the support structure 105, such as during all operational states of the device 100, as well as transitions between the operational states (e.g., transitions between opening and closing the device 100). In some instances, such spacing can prevent frictional interaction between the support structure 105 and the upper clamping member 120 as the upper clamping member 120 is moved relative to the lower clamping member 110, which movement is discussed further below. However, other embodiments may permit contact between the clamping member 120 and the support structure 105 in one or more operational states.

In the illustrated embodiment, the lower and upper clamping members 110, 120 have the same or similar profiles. For example, an outer edge of the lower clamping member 110 defines a first width at the connection region 130, narrows in a distal direction to a neck region that is between the opposing recesses 116, 118, broadens in advance of the clamping surface 112, and then, at the clamping surface 112, narrows to a somewhat rounded distal end. Likewise, an outer edge of the upper clamping member 120 defines a first width at the connection region 130, narrows in a distal direction to a neck region that is between the opposing recesses 126, 128, broadens in advance of the clamping surface 122, and then, at the clamping surface 122, narrows to a somewhat rounded distal end. The configurations of the recesses 116, 118 and 126, 128 can vary somewhat, such as to accommodate different regions of the support structure 105. Further, in the illustrated embodiment, the upper clamping member 120 is slightly longer than the lower clamping member 110, which can result in a slight "overbite" of the jaw-like clamping surfaces (see FIG. 3C).

When the device 100 is in the open or non-clamping state, the clamping surfaces 112, 122 can be spaced from each other to define a gap 132. The gap 132 can be sufficiently large to permit at least a portion of an accessory to be inserted therein. For example, portions of gloves can be inserted into the gap 132. In some instances, a maximum distance between the clamping surfaces 112, 122 is no less than about 0.5, 0.75, or 1.0 inches (no less than about 1.3, 1.9, or 2.5 centimeters). In some instances the gap 132 has a significant depth, as measured from the distal-most tip of the device 100 to a distal face of the support structure 105. In some embodiments, having a gap 132 with a large depth can permit insertion of a significant portion of the accessory between the clamping members 110, 120, and may provide for a relatively secure grasping of the accessory. In various embodiments, a depth of the gap 132 is no less than about 1.0, 1.5, or 2.0 inches (no less than about 2.5, 3.8, or 5.1 centimeters). A maximum width of the clamping surfaces 112, 122 may also be relatively large, in some instances, which can provide for large surface areas that can cooperate to hold the accessory. For example, in various embodiments, a maximum width of the clamping surfaces 112, 122 is no less than about 0.5, 0.75, or 1.0 inches (no less than about 1.3, 1.9, or 2.5 centimeters).

In the illustrated embodiment, the lower and upper clamping members 110, 120 are formed of a unitary, monolithic piece of material. The material can be of any suitable variety, and may have an elastic resilience that permits the material to be displaced from a natural state to a displaced state under displacing forces, and then return to the natural state when the displacing forces are removed. For example, in various embodiments, the lower and upper clamping members 110, 120 may be formed of a unitary piece of metal, plastic, and/or other suitable material. In some embodiments, the material can comprise one or more of polyethylene terephthalate, polystyrene, polyvinyl chloride, polytetrafluoroethylene, polyvinylidine chloride, polyethylene (LDPE and/or HDPE), or polypropylene. Any suitable manufacturing process for forming the clamping members 110, 120 is also contemplated. For example, some processes may include one or more of extrusion, injection molding, blow molding, rotational molding, three-dimensional printing, casting, etching, molding, molding, evaporative-pattern casting, spray forming, dip molding, or thermoforming.

In the illustrated embodiment, in FIGS. 1A-1F, the clamping members 110, 120 are in a natural state and are free of displacing forces. Stated otherwise, the clamping members 110, 120 are naturally in an orientation in which the upper clamping member 120 extends at an angle relative to the lower clamping member 110. As further discussed below, the locking arm 106 can be rotated to displace the upper clamping member 120 toward the lower clamping member 110. Such displacement can give rise to a restorative force that tends to urge the clamping member 120 back to its natural position. The locking arm 106 can be configured to reside in a stable state in which this restorative force is opposed in order to maintain the clamping members 110, 120 in a locked or clamping state. Release of the locking arm 106 can permit the clamping members 110, 120 to return to their natural state. In various embodiments, the clamping member 120 can be relatively stiff so as to bend slightly, insignificantly, or, in some instances, not at all. In certain of such embodiments, the restorative forces may arise primarily in the connection region 130 as the clamping members 110, 120 are moved relative to each other. Other suitable configurations are also contemplated, including certain configurations discussed below.

In the illustrated embodiment, the device 100 further includes a clip member 140, which can be coupled with other portions of the device 100 in any suitable manner. In the illustrated embodiment, the clip member 140 is coupled to the clamping members 110, 120 via a connection region 150. The illustrated clip member 140 is configured to move relative to the lower clamping member 110. In particular, the clip member 140 is biased toward the lower clamping member 110. Stated otherwise, in the illustrated embodiment, the clamping members 110, 120, 140 are formed of a unitary, monolithic piece of material. The material is elastically resilient such that the clip member 140 can be displaced from a natural orientation when subjected to a displacement force, and can return to the natural orientation when the displacement force is removed. The clip member 140 can be positioned such that a distal end thereof is in close proximity to an underside of the clamping member 110. The clip member 140 can be moved away from the clamping member 110 to permit an item, such as an article of clothing (e.g., a belt or belt loop) to be advanced between the clip member 140 and the clamping member 110. The clip member 140 can naturally return to its natural state when the displacement forces associated with such advancement are removed.

In the illustrated embodiment, the clip member 140 includes a retainer 142 that is configured to prevent or inhibit the article of clothing from exiting from a retaining channel 152 that is defined, at least in part, by the underside of the clamping member 110, the underside of the support structure 105, and an upper side of the clip member 140. The illustrated retainer 142 is a protrusion 144 that extends upwardly and either contacts or is positioned close to the support structure 105 (see FIG. 1C).

In the illustrated embodiment, a distal end of the clip member 140 is curved away from the clamping member 110. Such an arrangement can assist in introducing the article of clothing into the retaining channel 152.

Figure 1B:
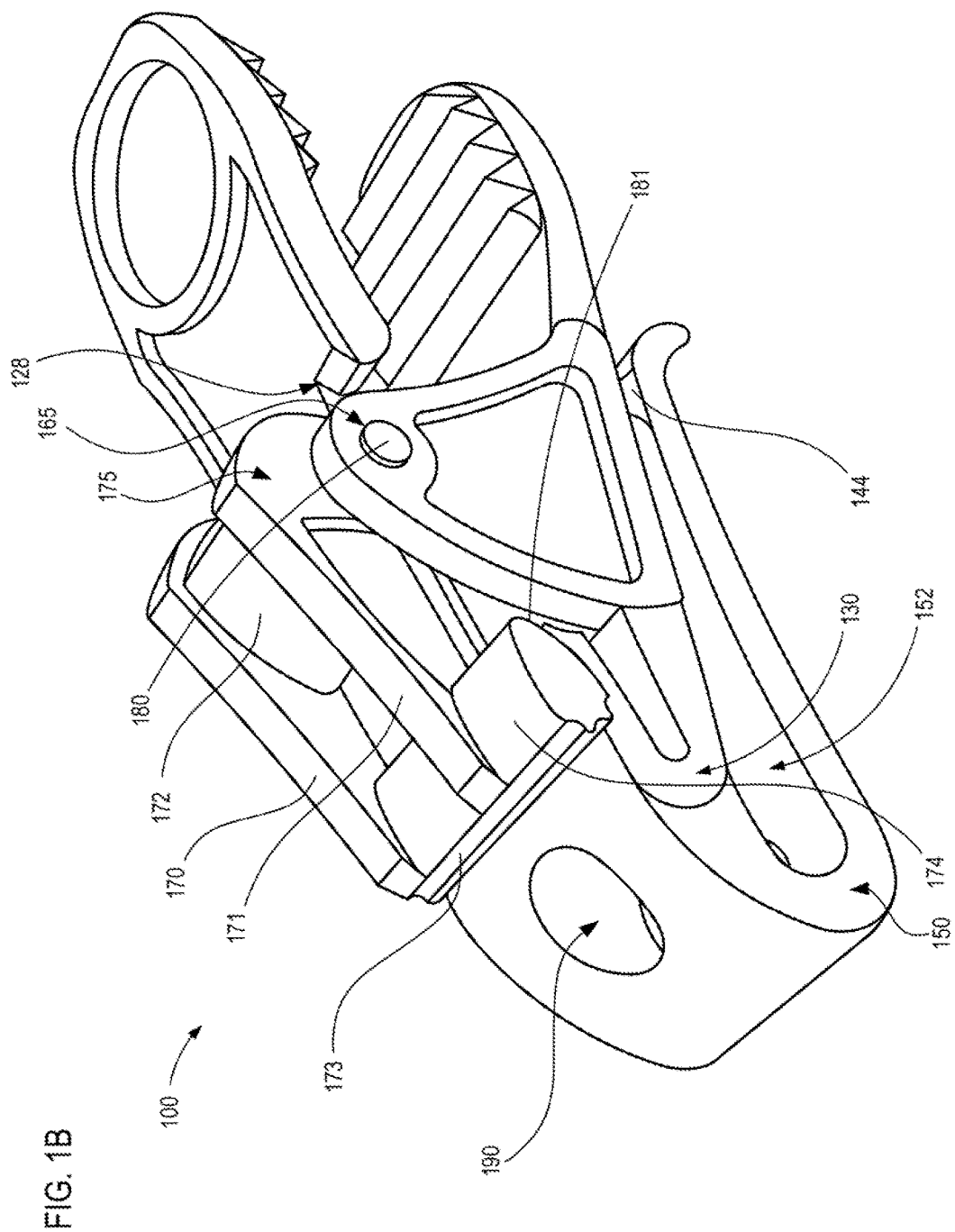
FIG. 1B is another upper perspective view thereof.
Figure 1E:
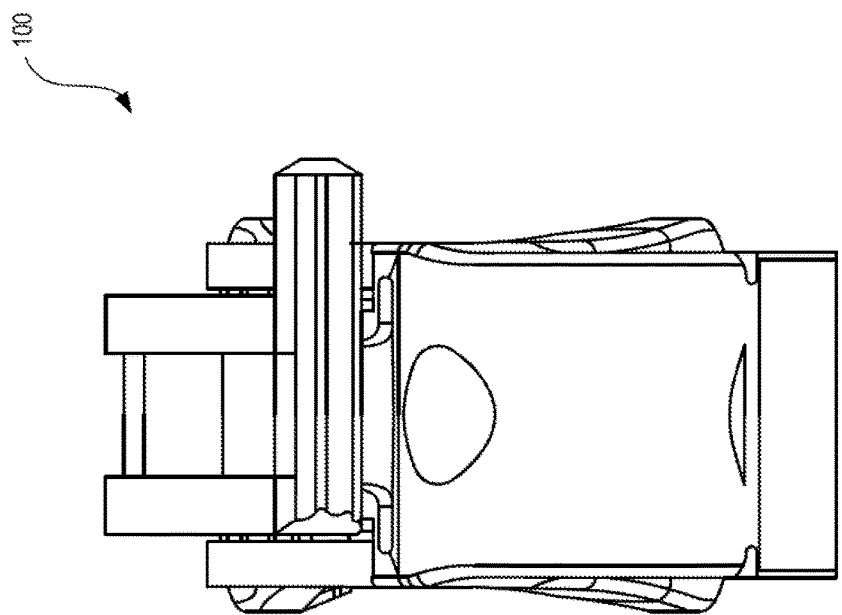
FIG. 1E is a rear elevation view thereof.
Figure 1D:
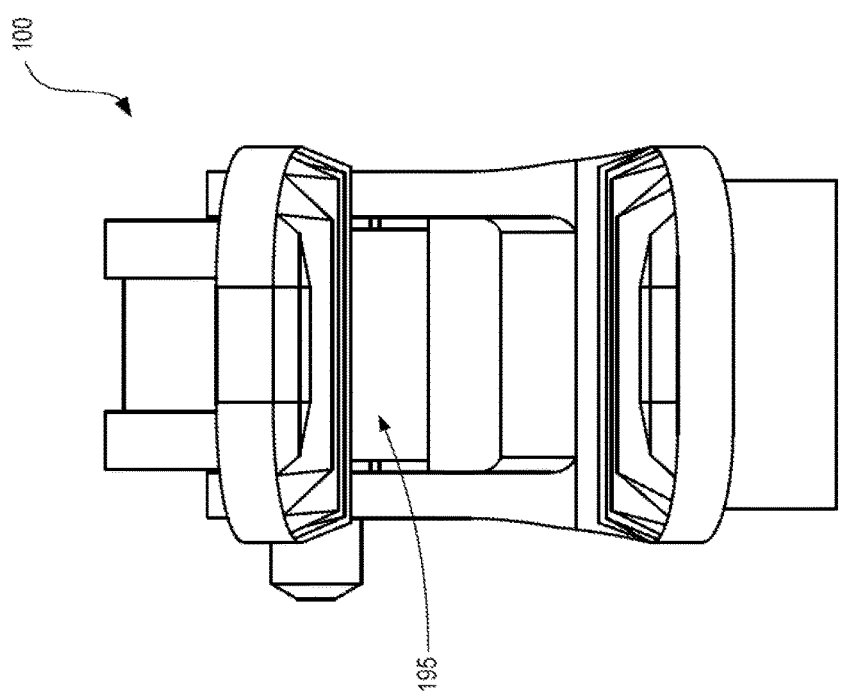
FIG. 1D is a front elevation view thereof.
Figure 1F:
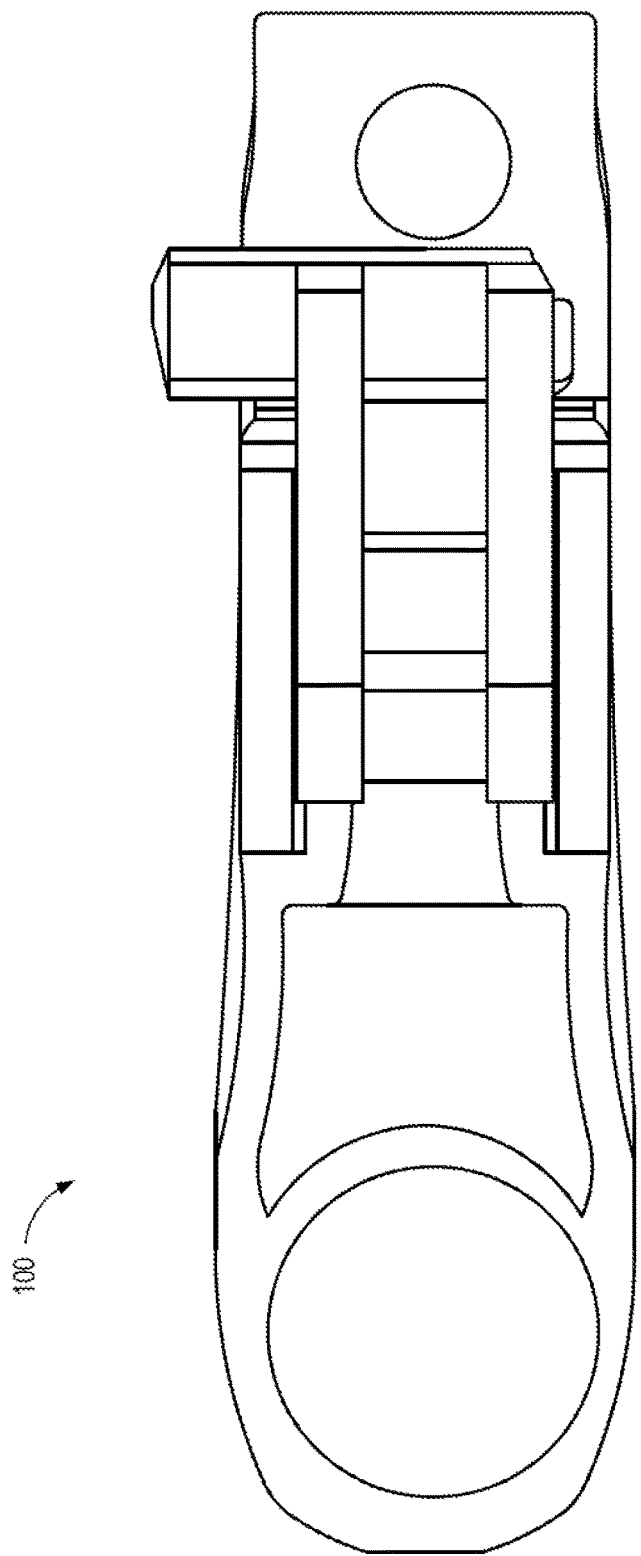
FIG. 1F is a top plan view thereof.
Figure 2B:
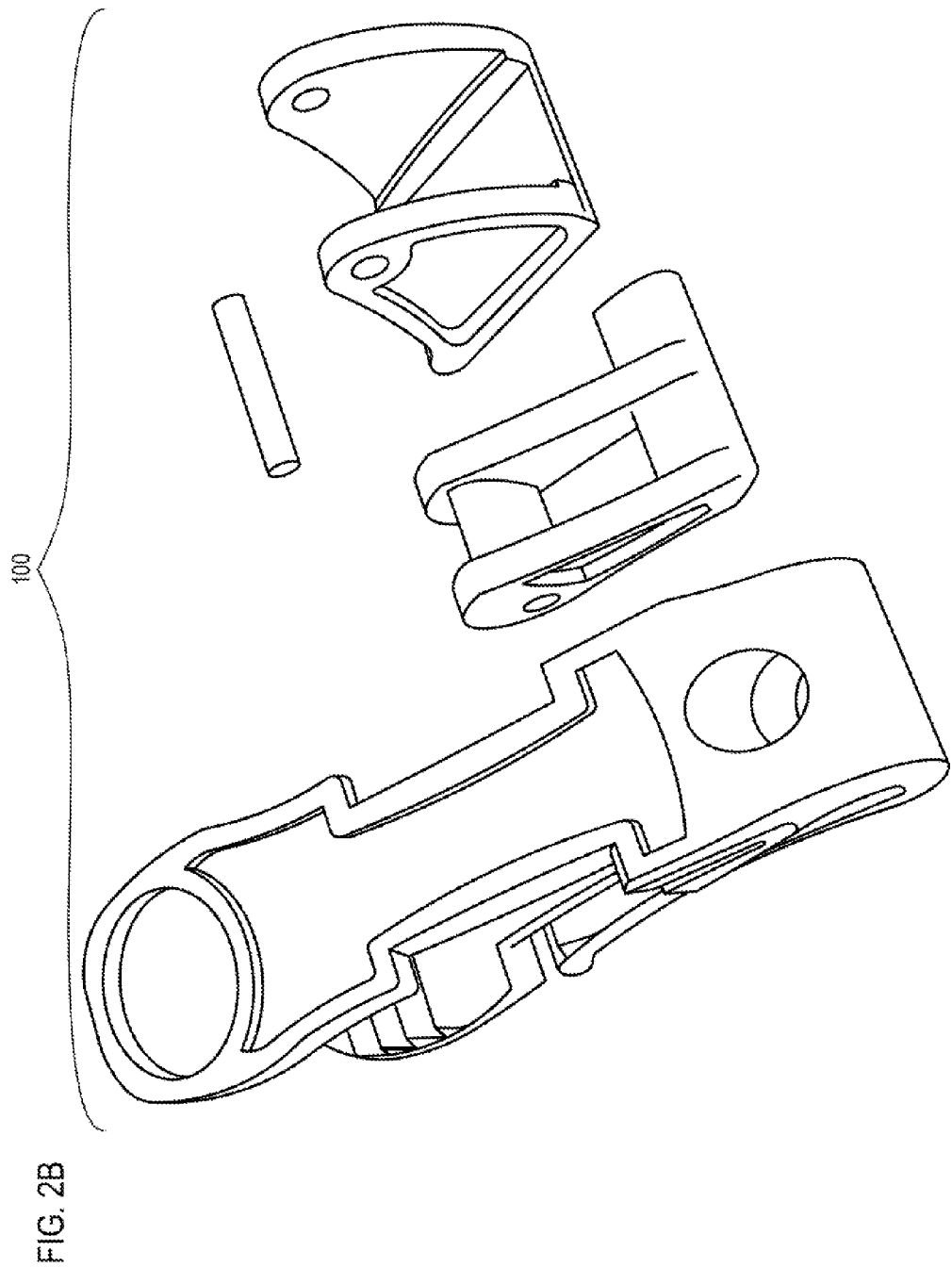
FIG. 2B is another exploded upper perspective view thereof.

With continued general reference to FIGS. 1A-1F and 2A-2F, and with particular reference to FIGS. 1A and 2A, the illustrated support structure includes a platform or base 160 and a pair of sides, wings, or posts 162, 164 that extend from the base 160. The posts 162, 164 can extend upwardly from opposing sides of the base 160. In the illustrated embodiment, the posts 162, 164 are reinforced with additional material, so as to be thicker, near the base 160. The illustrated posts 162, 164 are also longer near the base 160 and taper in an upward direction. The posts 162, 164 are generally triangular. The posts 162, 164 can be well suited for distributing loads from the upper ends thereof to the base 160. Other shapes and arrangements of the base and the posts are possible.

The upper ends of the posts 162, 164 include openings or apertures 163, 165, respectively, which can receive ends of the pivot member 107. In some embodiments, apertures 163, 165 are sized to permit the pivot member 107 to rotate freely therein. In other embodiments, the pivot member 107 may be fixedly secured to the support structure 105 at the apertures 163, 165, and the locking arm may rotate about the pivot member 107.

With continued reference generally to FIGS. 1A-1F and 2A-2F, and with particular reference to FIGS. 1A, 1B, and 2A, the locking arm 106 can include one or more struts 170, 171. The struts may be joined by laterally extending supports 172, 173. In the illustrated embodiment, the struts 170, 171 extend along generally parallel planes. Moreover, in the illustrated embodiment, the clamping members 110, 120 are generally planar. Planes that extend through the struts 170, 171 may be generally orthogonal to planes that extend through one or more of the clamping members 110, 120. The struts 170, 171 may be substantially parallel to the posts 162, 164. Planes that extend through the struts 170, 171 may be substantially orthogonal to the pivot member 107. Stated otherwise, the struts 170, 171 may rotate in planes that are orthogonal to a pivot line 197 (see FIG. 2C) about which the locking arm 106 rotates when the device 100 is assembled. Certain of such arrangements of the locking arm 106 may provide for a structurally sound or strong locking arm that is capable of resisting forces applied thereto in transitioning the device 100 between an open or unclamped state and a locked or clamped state, and may also reduce an amount of material that may be used in the arm.

In the illustrated embodiment, the cross-member or laterally extending support 172 defines a channel 179 (FIG. 2A) that receives the pivot member 107 therein. The cross-member or laterally extending support 173 may be positioned at a distal (relative to the pivot point) end of the arm 106. In the illustrated embodiment, a distal-most surface of the support 173 includes grip-enhancing features, such as a series of grooves. Further or other gripping features are also contemplated, such as, for example, an elastomeric layer or coating. The gripping features may assist in transitioning the locking arm 106 to or from the locked orientation.

In some embodiments, the support 173 can include one or more lateral extensions 174, which may also be referred to as transverse protrusions. The extension 174 can extend outwardly beyond an outer edge of the upper clamping member 120 (see, e.g., FIGS. 1C-1F), which can provide for ready access to and manipulation of the locking arm 106 when the arm is positioned adjacent to the upper clamping member 120, such as when the clamping member is in the locked orientation (see FIGS. 3C and 4A), or is in a position within the unlocked orientation (see FIGS. 1C and 3A).

Figure 2C:
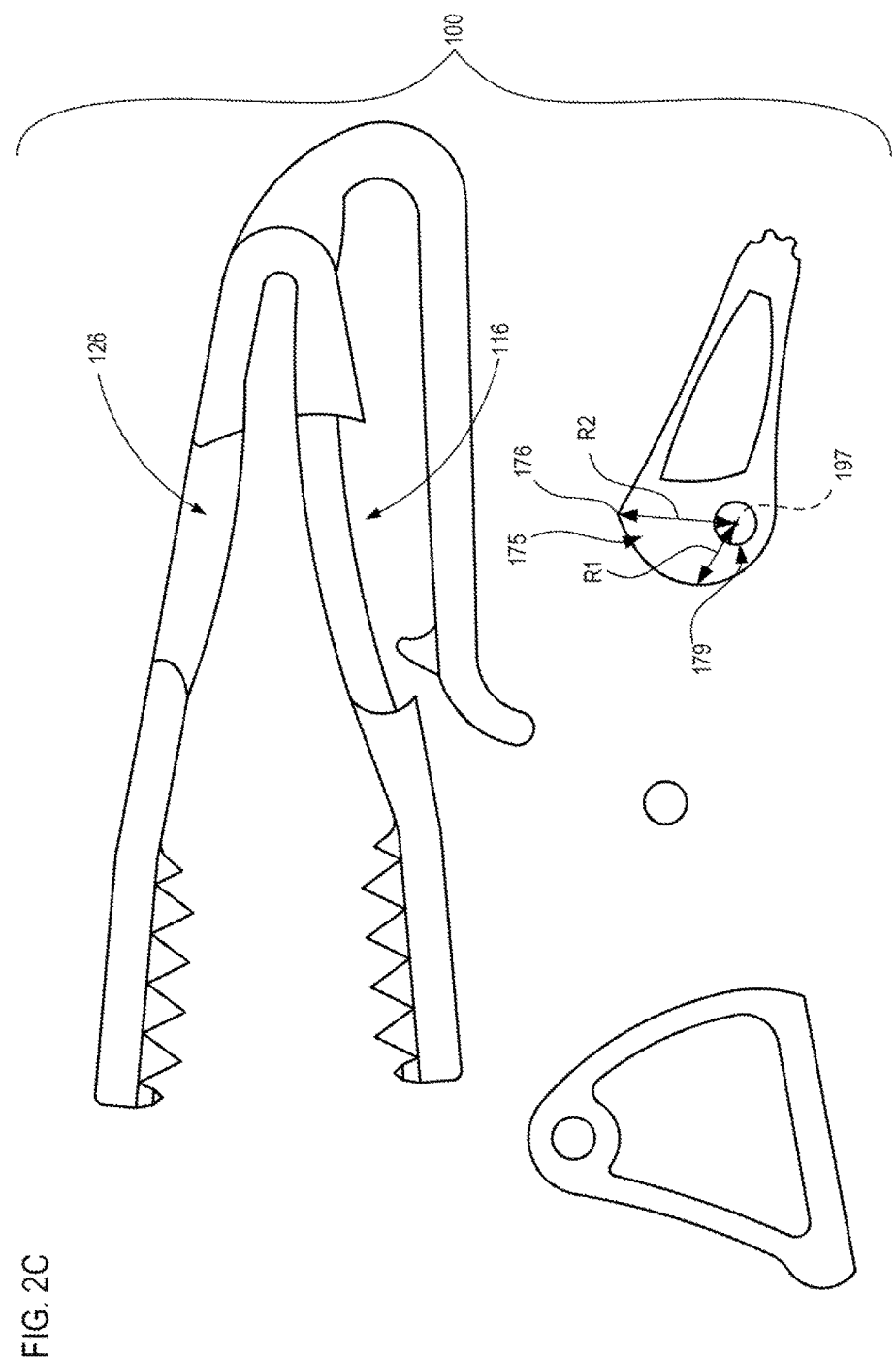
FIG. 2C is an exploded side view thereof.
Figure 2D:
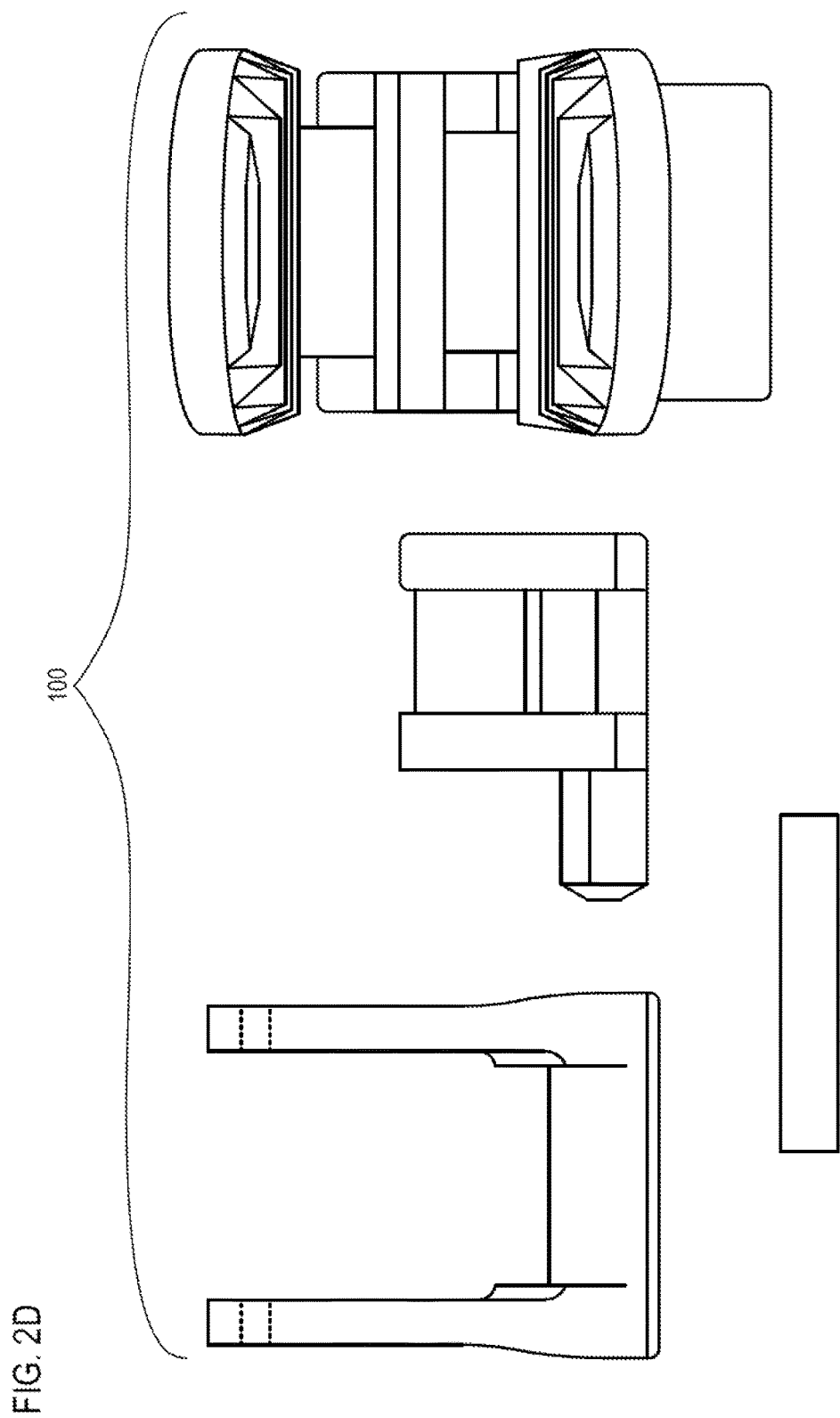
FIG. 2D is an exploded front elevation view thereof.

As shown in FIG. 2C, the illustrated embodiment of the locking arm 106 includes a cam portion 175, which can be a surface that is configured to interact with the upper clamping member 120 to effect movement thereof as the locking arm 106 is rotated. A rotational axis 197 can extend through the channel 179. A radius of the cam portion 175 (or cam surface) can increase in one angular direction, relative to the rotational axis 197. In the illustrated embodiment, the cam portion 175 smoothly transitions from relatively small radius to a relatively large radius. In the illustrated embodiment, the maximum radius R2 of the cam portion 175 extends from the rotational axis 197 to an angled ridge 176. The angled ridge 176 is discussed further below with respect to FIGS. 3A-3C and the operation of the illustrated locking arm 106.

In the embodiment illustrated in FIG. 2C, the cam portion 175 extends between a position that is at a first radius R1 from the rotational axis 197 to a position that is at a second radius R2 from the rotation al axis 197. The second radius R2 can be greater than the first radius R1. In the illustrated embodiment, the radii between the first and second radii R1, R2 steadily increase in size. Such an arrangement may permit a smooth, continuous, or steady movement of the upper clamping member 120 as the locking arm 106 is rotated from the unlocked state to the locked state, or vice versa. Other arrangements of the cam portion 175 are also possible, including, for example, non-steady transitions from a smaller radius to a larger radius.

With continued reference generally to FIGS. 1A-1F and 2A-2F, in the illustrated embodiment, the pivot member 107 is a pin 180 that is sized to extend through the channel 179 of the locking arm 106 and through the apertures 163, 165 of the support structure 105. The pin 180 may be formed of any suitable material, and may be substantially rigid. In other embodiments, the pivot member 107 may comprise a pair of protrusions that are integral to the locking arm 106 and that extend laterally outwardly from the locking arm 106 in a manner similar to the ends of the pin 180. In still other embodiments, the pivot member 107 may comprise a pair of protrusions that extend laterally inwardly from the posts 162, 164 of the support structure 105 into corresponding recesses in the locking arm 106, such as in a snap-fit arrangement. Other suitable arrangements are contemplated.

In certain embodiments, the device 100 can be configured to couple with a fastening device (not shown) of any suitable variety, such as, for example, one or more of a key ring or a carabineer. In the illustrated embodiment, the device 100 includes a coupling channel 190 that extends through its proximal end 102. The fastening device thus may extend through the coupling channel 190 so as to be coupled with the device 100.

In some embodiments, the device 100 can include a display region 192 that may be used to display any desired indicia. For example, the display region 192 may be particularly well suited to display a company logo and/or other information. In the illustrated embodiment, the display region 192 defines a circular region that is configured to receive a plate, tag, button, sticker, insignia, etc. Other suitable shapes for the region are contemplated, and the plate, tag, button, sticker, insignia, or other display indicia may define a shape that is complementary thereto or that is different from that of the display region 192. In the illustrated embodiment, the display region 192 is at the distal end 101 of the device 100 and is positioned opposite the upper clamping surface 122. In the illustrated embodiment, the display region 192 is spaced from the locking arm 106 so as not to be covered by the locking arm 106 when the locking arm is in the locked state (see FIG. 4A).

Some embodiments of the device 100 can include reinforcing ridges or ribs 194. In the illustrated embodiment, the reinforcing ribs 194 extend along outer edges of the of the lower and upper clamping members 110, 120 and along outer edges of the struts 170, 171 of the locking arm 106. The reinforcing ribs 194 can provide structural rigidity to these respective portions of the device 100. In some instances, the reinforcing ribs can reduce the amount of material that used in a device and/or may permit a relatively weaker or more flexible material to be used, which may, in some cases, reduce production costs of the device 100.

In the illustrated embodiment, the device 100 defines a channel 195 through which the upper clamping member 120 extends. In particular, the lower clamping member 110, the support structure 105, and the locking arm 106 define the channel 195, which extends in a generally longitudinal direction. These structures may be said to substantially encompass or encircle the upper clamping member 120. The upper clamping member 120 can move within the channel 195 in directions that are substantially transverse to a longitudinal axis of the upper clamping member 120, such as in manners discussed further below. In some embodiments, the upper clamping member 120 may be spaced from the support structure 105 so as not to contact the support structure, which may allow for frictionless movement relative to the support structure 105. In other embodiments, the upper clamping member 120 may contact the support structure 105 in some or all positions.

Figure 3A:
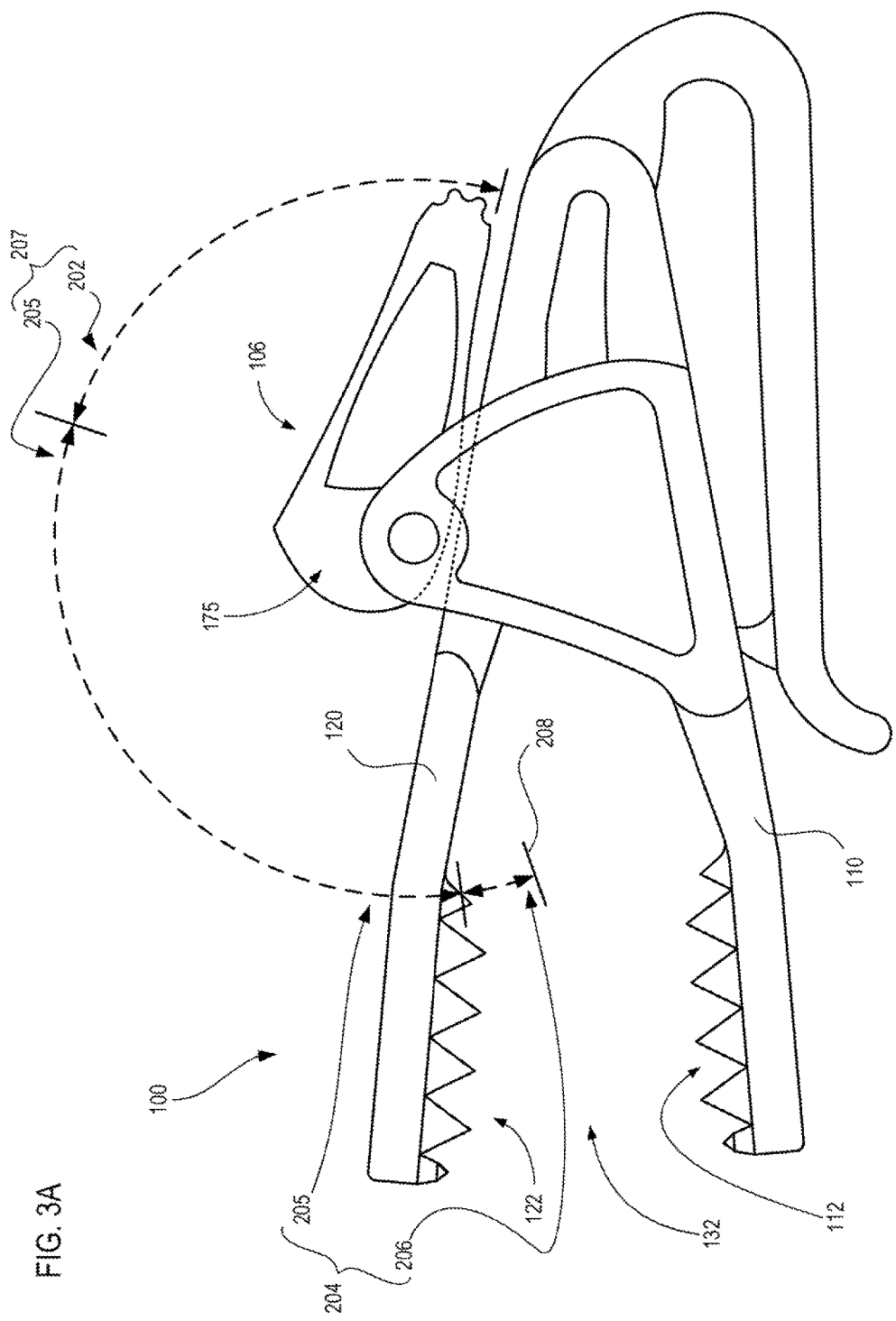
FIG. 3A is a side elevation view of the accessory fastening device in the open or unlocked state, wherein an embodiment of a locking arm is shown in an idle zone and, in particular, in a position in which there is no contact between the locking arm and an upper clamping member of the device.
Figure 3B:
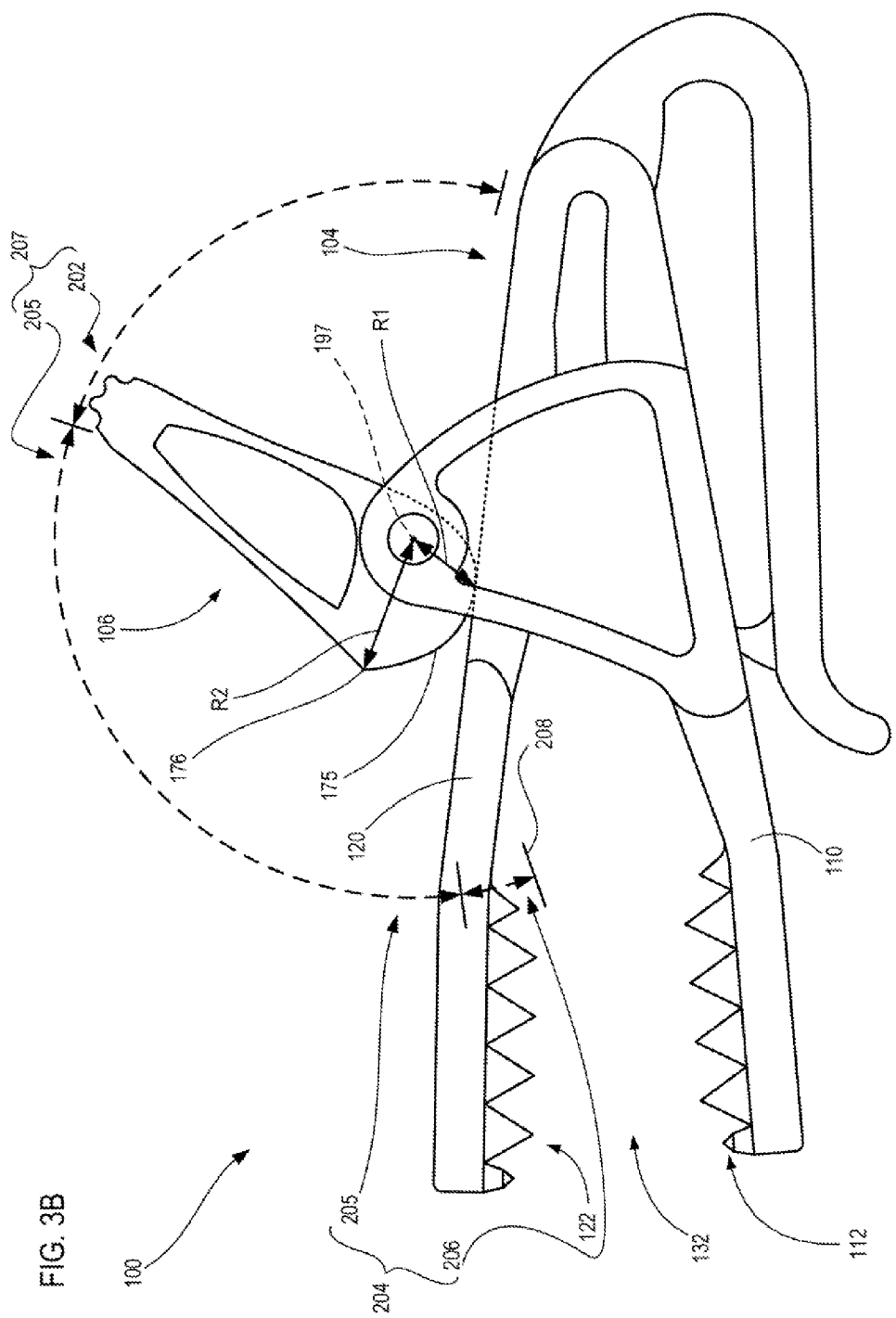
FIG. 3B is a further side elevation view of the accessory fastening device in the open or unlocked state, wherein the locking arm is shown being moved through a work zone and, particularly, in a position in which a cam portion of the locking arm has engaged the upper clamping member of the device.
Figure 4B:
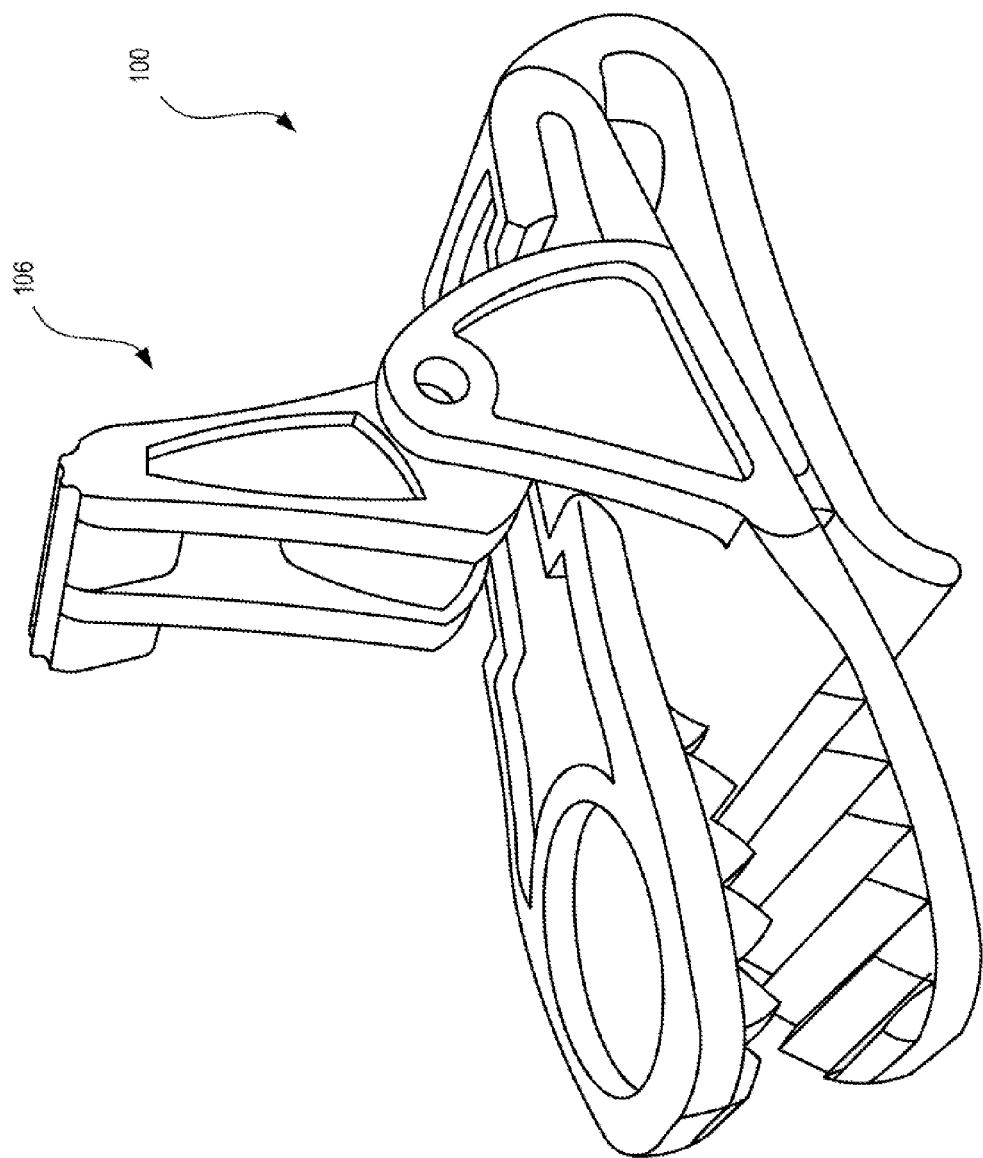
FIG. 4B is an upper perspective view of the accessory fastening device, wherein the locking arm is in the unlocked state and is being moved through a work zone in which a natural bias of the upper clamping member urges the locking arm to rotate to a more stable orientation.
Figure 4C:
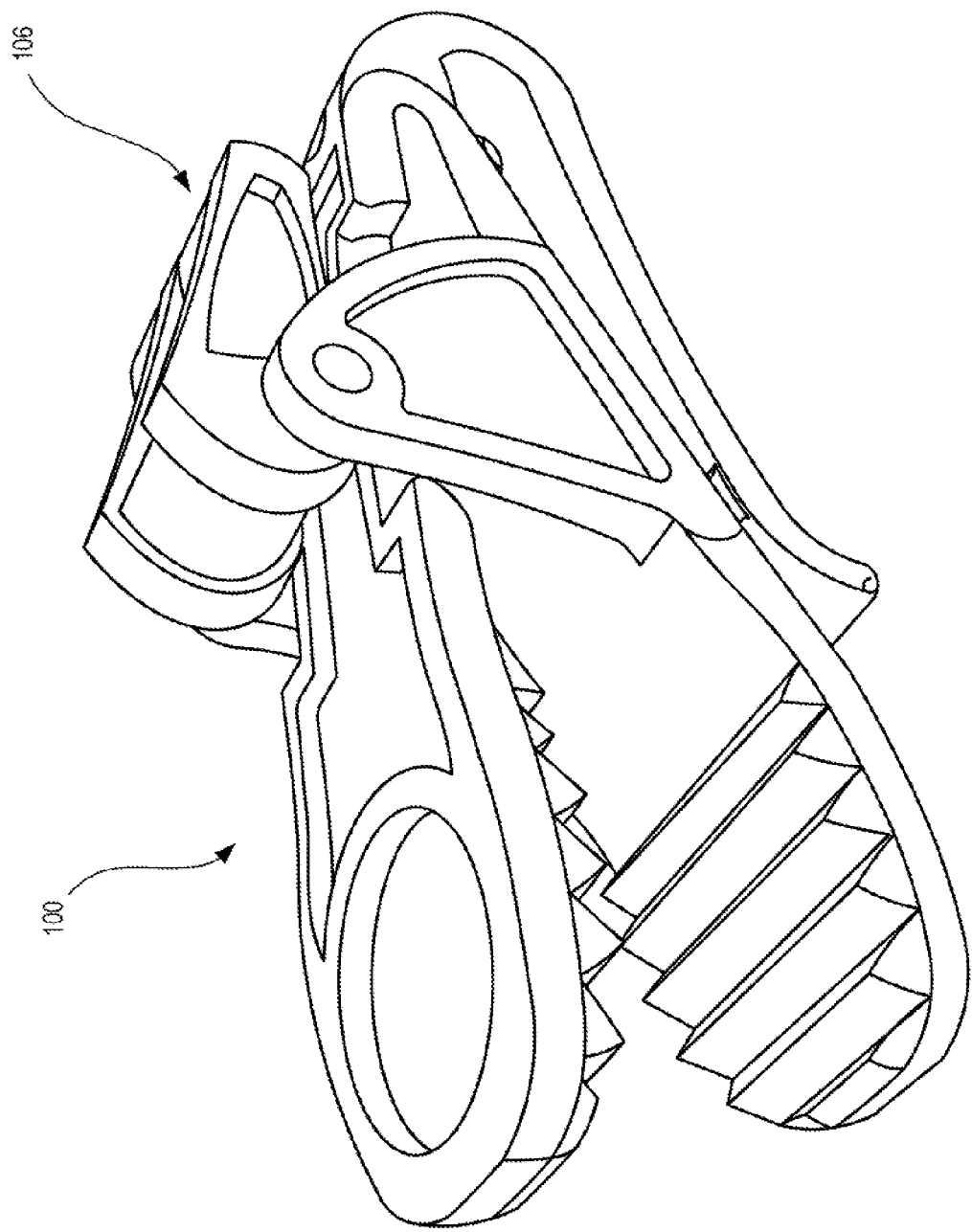
FIG. 4C is an upper perspective view of the accessory fastening device in another position within the unlocked state.

FIGS. 3A-4C depict an illustrative operational sequence of the device 100. In FIGS. 3A-3C, the device 100 is transitioned from an unlocked state to a locked state. In FIGS. 4A-4C, the device 100 is transitioned from the locked state to the unlocked state. It may also be said that FIGS. 3A-4C depict four different operational orientations of an embodiment of the device 100. As discussed further hereafter, FIGS. 3A, 3B, 4B, and 4C depict the device 100 in the unlocked state, with FIGS. 3A and 4C depicting the locking arm 106 in a first orientation while in the unlocked state and FIGS. 3B and 4B depicting the locking arm 106 in second and third orientations while in the unlocked state, respectively. FIGS. 3C and 4A depict the device 100 in the locked state, with the locking arm 106 in a fourth operational orientation.

In the embodiment depicted in FIGS. 3A-4C, the device 100 is bistable, meaning that the device 100 can remain in either the locked state or the unlocked state indefinitely, in the absence of forces acting on the device, once the device 100 has been transitioned into either the locked state or the unlocked state. Each of the locked and locked states may also be referred to as a separated, discrete, distinct, or alternative resting state of the device. In the resting state, forces acting on the locking arm 106 can be in equilibrium such that the locking arm 106 does not rotate relative to the lower clamping member 110. In order to transition the device 100 into the locked state, an amount of force that is at least equal to a threshold value is applied to the locking arm 106. Similarly, in order to transition the device 100 into the unlocked state, an amount of force that is at least equal to a threshold value (which may be the same as the previously mentioned threshold value) is applied to the locking arm 106 in the opposite direction. Applying an amount of force to overcome the threshold value in either direction may also be referred to as overcoming an energy barrier to transition the device 100 into a resting state. The illustrated device 100 may also be referred to as an over-center system.

With reference to FIG. 3A, the locking arm 106 can be capable of transitioning through a variety of different operational zones, including an idle zone 202 and a work zone 204. The work zone 204 includes a first transition zone 205 and a second transition zone 206. When the locking arm 106 is at any position within the idle zone 202 and the first transition zone 205, the locking arm 106 (and the device 100) are in an open or unclamped state, which may also be referred to as an unclamped zone 207. When the locking arm is at a closed position 208, the locking arm 106 (and the device 100) are in a closed or clamped state. The various zones are depicted as portions of a circular arc, which represents a continuous range of positions through which the locking arm 106 can be rotated.

With reference to FIG. 3A, the locking arm 106 is at a position within the idle zone 202. In this position, as with any position within the idle zone 202, the cam portion 175 of the locking arm 106 does not contact the upper clamping member 120. The locking arm 106 can transition through the idle zone 202 without imparting any forces to the upper clamping member 120 that would urge the upper clamping member 120 toward the lower clamping member 110. In some embodiments, a distal end of the locking arm 106 (e.g., distal relative to the axis of rotation of the arm) may rest against the upper clamping member 120 at one end of the idle zone 202.

FIG. 3B depicts the device 100 with the locking arm 106 having been rotated to a position where the cam portion 175 just touches an outer surface, or outer face, of the upper clamping member 120. Stated otherwise, the locking arm 106 has been rotated out of the idle zone 202 to the beginning of the first transition zone 205. As the locking arm 106 is further rotated in the counterclockwise direction (in the reference frame of FIG. 3B), the radius of the cam portion 175 increases from R1 to R2. The locking arm 106 is constrained to rotate about the axis 197, and thus the increased radius of the cam portion 176 causes the upper clamping member 120 to move away from the axis 197 toward the lower clamping member.

In the illustrated embodiment, the clamping members 110, 120 are biased away from each other. Accordingly, rotating the locking arm 106 in the counterclockwise direction works against this bias so as to urge the upper clamping member 120 toward the lower clamping member 110. Energy added to the device 110 in this manner can be stored as potential energy in the spring-like clamping unit 104.

When the angled ridge 176 of the locking arm 106 comes into contact with the upper member 120, it can translate along the upper member 120 for a short distance. At some point (e.g., when the radius R2 is orthogonal to the upper member 120), an energy maximum, or a threshold level of force is reached, which represents the end of the first transition zone 205. Some of the stored energy may be used to work against the angled ridge 176, creating torque (relative to the axis 197) that naturally rotates the locking arm 106 through the second transition zone 206. Stated otherwise, once the beginning of the second transition zone 206 is reached, the locking arm 106 is automatically rotated through the rest of the second transition zone 206 and into the locked position 208, as shown in FIG. 3C. The locking arm 106 can stably remain in the locked position 208 and can maintain the clamping members 110, 120 in close proximity to each other against the spring-like potential energy stored within the clamping unit 104.

In the illustrated embodiment, as the locking arm 106 is transitioned from the unlocked state to the locked state, energy is applied to the locking arm 106 throughout the first transition zone 205 in order to overcome the natural bias of the clamping unit 104 (with the spring-like clamping unit 104 storing energy). Then, the locking arm 106 automatically transitions through the second transition zone 206 as a portion of the stored energy is released.

Conversely, as illustrated in FIGS. 4A-4C (and also by viewing FIGS. 3A-3C in reverse), as the locking arm 106 is transitioned from the locked state to the unlocked state, energy is applied to the locking arm 106 in order to move the locking arm 106 through the second transition zone 206. This can involve working against the natural bias of the clamping members 110, 120, which bias may be stronger at this point than in the first transition zone 205 due to the greater displacement of the upper clamping member 120. Once the first transition zone 205 is reached, however, the energy that was previously stored in moving the locking arm 106 through the first transition zone in the counterclockwise direction is released and the locking arm 106 automatically rotates in the clockwise direction through the first transition zone 205. The potential energy can be converted to kinetic (e.g., rotational) energy of the locking arm 106.

Embodiments of a bistable device 100, such as that just described, can be advantageous in some circumstances. For example, in some instances, a bistable device 100 can readily permit insertion of an accessory into the gap 132. In particular, the device 100 can be in a resting state when the clamping surfaces 112, 122 are spaced from each other, which can free up one or both of a user's hands to manipulate the accessories into a desired position within the device 100. The device 100 can also stay tightly closed when transitioned to the locked state, as the device 100 is also in a resting state when locked. This can permit the device 100 to securely hold the accessory. Such an arrangement may also ensure that the accessory is generally released only when the user desires that the accessory be released, as the user deliberately applies a force sufficient to overcome the threshold necessary to pass the locking arm 106 through the second transition zone 205.

In other embodiments, a bistable device 100 may have other constructions or arrangements. For example, in some embodiments, the idle zone 202 may be omitted. By way of illustration, in some embodiments, the locking arm 106 is positioned closer to the clamping member 120 and/or the cam portion 175 of the locking arm 106 is extended such that the cam portion 175 contacts the upper clamping member 120 when the locking arm 106 is in the position illustrated in FIGS. 3A and 4C.

As can be seen in FIGS. 3C and 4A, when the locking arm 106 or, more generally, the device 100 are in the locked state, the clamping surfaces 112, 122 can be in close proximity to each other. In some embodiments, the clamping surfaces 112, 122 can be in contact with each other in the locked state (and in the absence of an accessory), such as with some or all of the teeth interlocked with each other. In other embodiments, the clamping surfaces 112, 122 can be very close to each other, but not in direct contact. Stated otherwise, the clamping surfaces 112, 122 can be much closer to each other when the locking arm 106 has been rotated to the locked state than they are when the locking arm 106 is at the opposite end of its range of rotation.

Figure 5A:
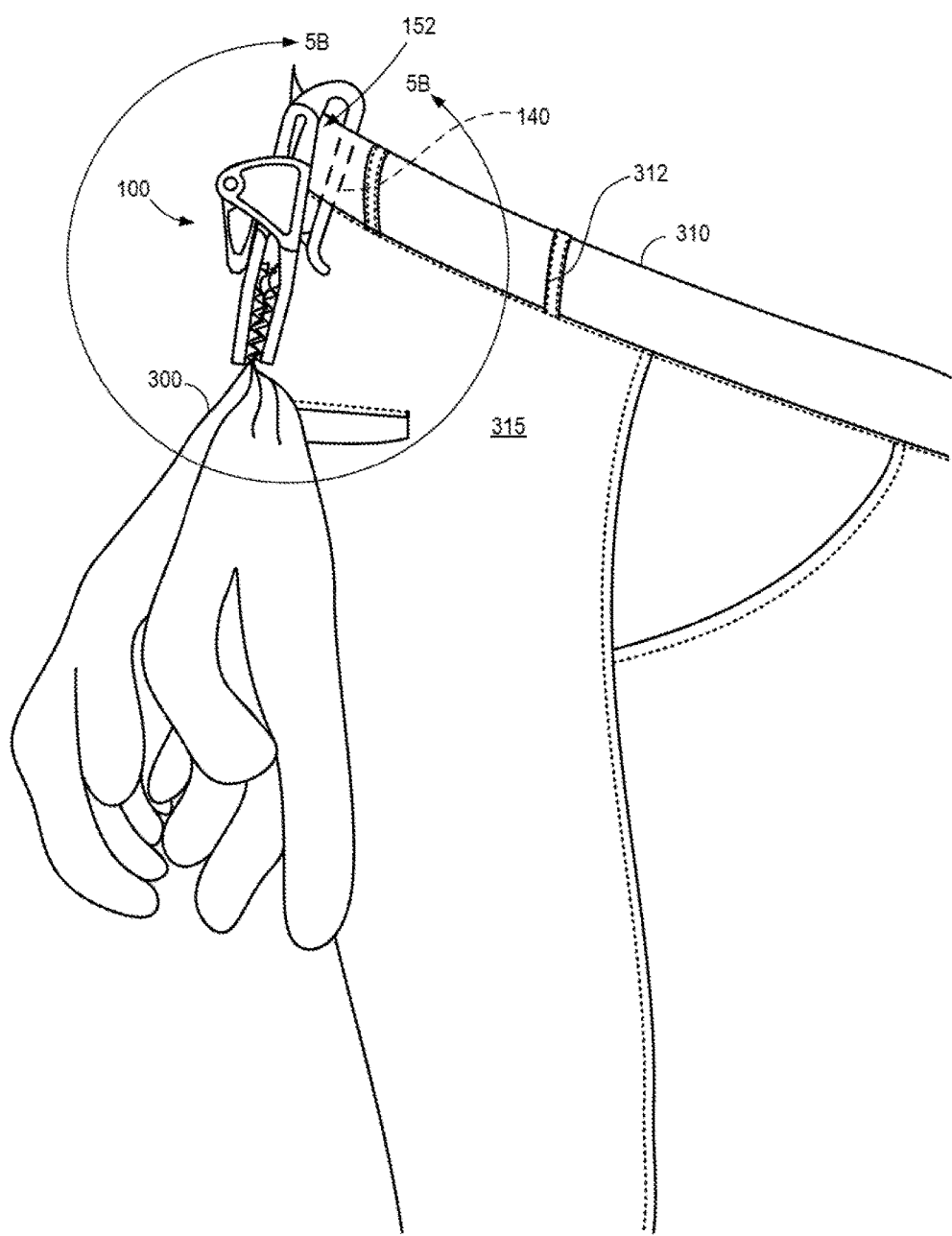
FIG. 5A is a perspective view of the accessory fastening device coupled with an article of clothing (a belt, in the illustrated embodiment) and coupled with accessories (a pair of gloves, in the illustrated embodiment)

FIGS. 5A and 5B depict an embodiment of the device 100 in an illustrative use. The user is wearing a pair of pants 315 having belt loops 312 and a belt 310 extending through the belt loops 312. The belt 310 is positioned within the retaining channel 152 that is defined, in part, by the clip member 140. The clip member 140 may be inserted between the belt 310 and the waist of the pants 315 after the user is already wearing these clothing items. In other instances, an end of the belt 310 may be inserted through the channel 152 as the user is putting on the belt 310.

The device 100 is in the locked state, and the clamping surfaces 112, 122 cooperate to tightly grip an accessory 300 between them. The accessory 300 can be of any suitable variety, as previously mentioned. In the illustrated embodiment, the accessory 300 is a pair of gloves. In various other instances or embodiments, the accessory 300 may be, for example, one or more of a respirator, hard hat, mask, helmet, hat, rag, cleaning clothes, towel, sports equipment, industrial equipment, rigging, keys, ear protection, etc. In some embodiments, the shape, size, dimensions, and/or other characteristics of the device 100, such as the clamping members 110, 120 (described above), may vary from the illustrated embodiment to be particularly suited to for use with a particular accessory.

Figure 6:
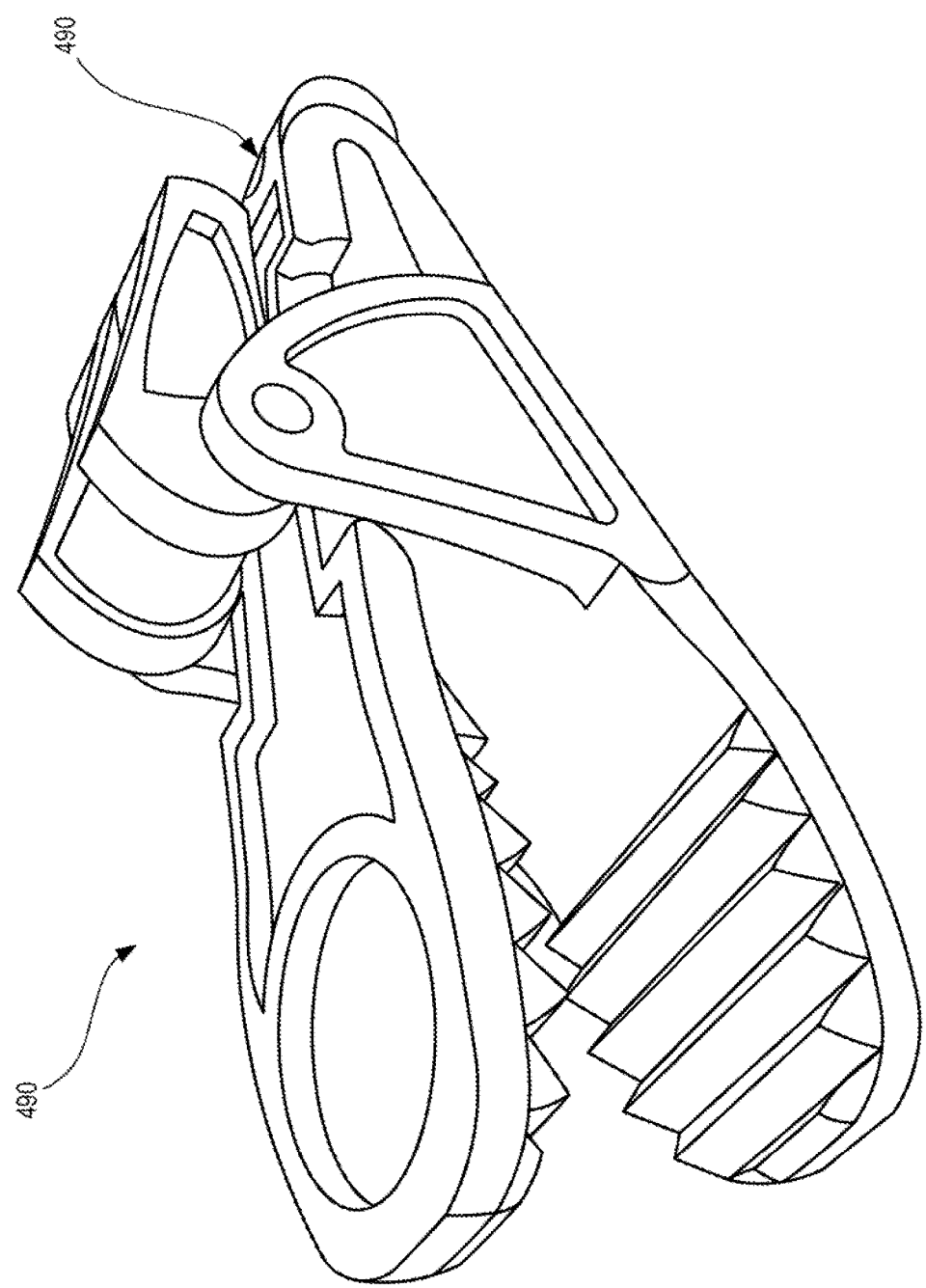
FIG. 6 is an upper perspective view of another embodiment of an accessory fastening device.

FIG. 6 illustrates another embodiment of an accessory fastening device 400 that can resemble the device 100 described above in certain respects. Accordingly, like features are designated with like reference numerals, with the leading digits incremented to "4." Relevant disclosure set forth above regarding similarly identified features thus may not be repeated hereafter. Moreover, specific features of the device 400 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the device 400. Any suitable combination of the features and variations of the same described with respect to the device 100 can be employed with the device 400, and vice versa. This pattern of disclosure applies equally to further embodiments depicted in subsequent figures and described hereafter, wherein the leading digits may be further incremented.

The device 400 can omit the clip member 140 discussed above. The device 400 defines an attachment channel 490, such as the attachment channel 190 discussed above. Any suitable fastening element, such as those discussed above with respect to the attachment channel 190, can be coupled with the device 400 via the attachment channel 490.

Figure 7:
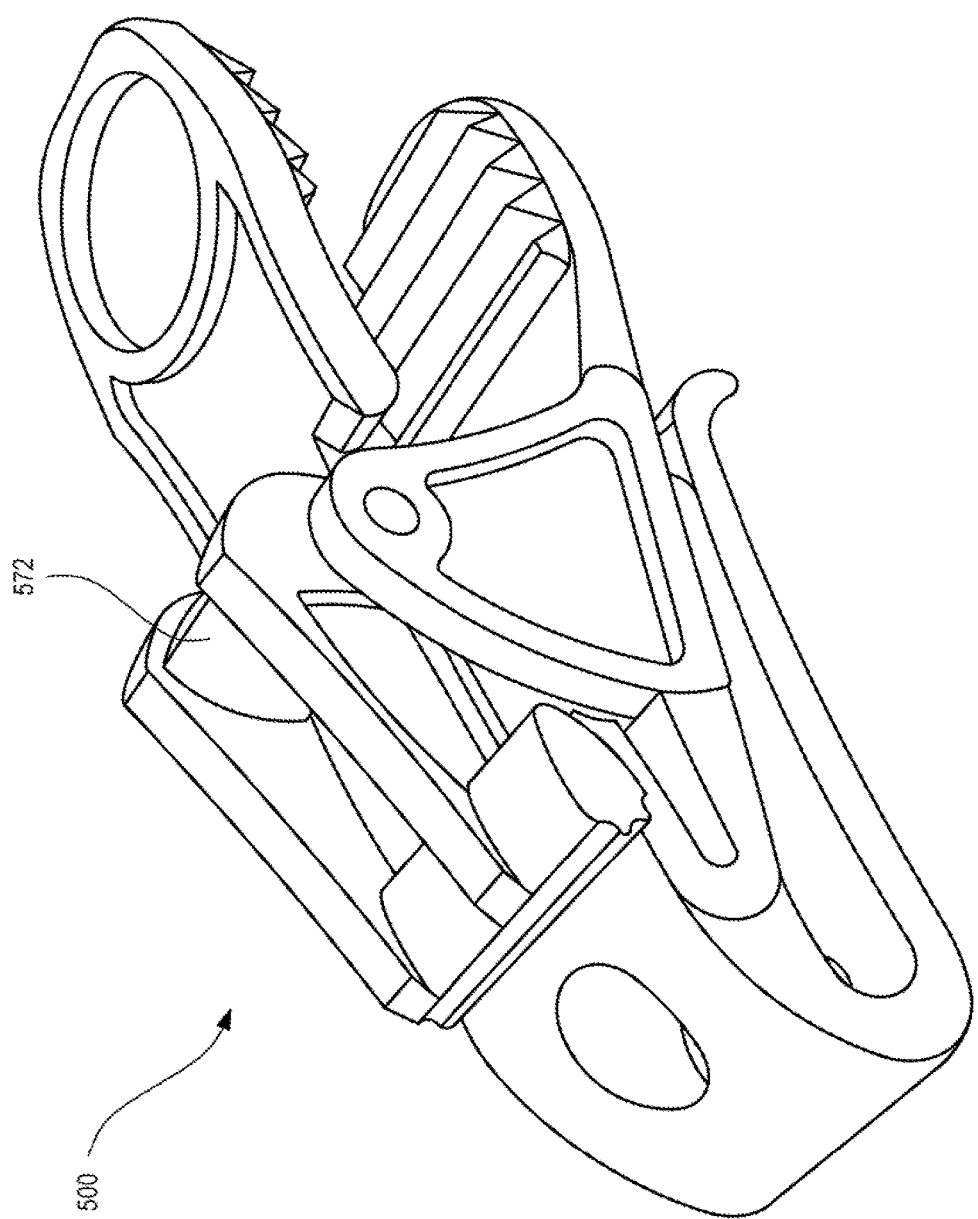
FIG. 7 is an upper perspective view of another embodiment of an accessory fastening device.

FIG. 7 illustrates an embodiment of a device 500 in which a laterally extending support 572 is smaller than the analogous support 172 discussed above. In some embodiments, a smaller support 572 may provide similar structural rigidity at reduced material costs.

With reference again to FIGS. 1A-2F, other embodiments may have more or fewer discrete components than the components 104, 105, 106, 107. For example, in some embodiments, the clamping unit 104 and the support structure 105 may be formed of a single monolithic piece. In other embodiments, the upper and lower clamping members 120, 110 may be formed of separate pieces that are joined via a pivoting member, such as a pin. In further embodiments, a bias, such as the bias present in the illustrated device 100, may be provided by a spring that is coupled with the clamping members 110, 120. Other arrangements are also contemplated.

This disclosure has been made with reference to various illustrative embodiments. However, those skilled in the art will recognize that changes and modifications may be made to these embodiments without departing from the scope of the present disclosure. While the principles of this disclosure have been shown in various embodiments, many modifications of structure, arrangements, proportions, elements, materials, and components may be made to accommodate a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub routines or only a portion of a method illustrated in the drawings, such as a small subset of step, may be a separate method. Stated otherwise, some additional methods may include only a portion of the steps shown in a more detailed method.

References to approximations are made throughout this specification, such as by use of the terms "substantially," "about" or "approximately." For each such reference, it is to be understood that, in some embodiments, the value, feature, or characteristic may be specified without approximation. For example, where qualifiers such as "substantially," "about" or "approximately" are used, these terms include within their scope the qualified words in the absence of their qualifiers.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

Recitation in the claims of the term "first" with respect to a feature or element does not necessarily imply the existence of a second or additional such feature or element. Elements specifically recited in means-plus-function format, if any, are intended to be construed in accordance with 35 U.S.C. § 112(f). Embodiments of the invention in which an exclusive property or privilege is claimed are defined as follows.

What is claimed is:

1. An accessory fastening device comprising:
   a first clamping member comprising a first clamping surface;
   a second clamping member comprising a second clamping surface that faces the first clamping surface;
   a support structure comprising a pair of sides, wherein each side comprises an aperture through which a pivot axis extends,
   a locking arm that is rotatable about the pivot axis to rotate between an unlocked state and a locked state; and
   a biasing portion joining the first and second clamping members, wherein the biasing portion is configured to urge the first clamping member and the second clamping member away from each other when the locking arm is in the unlocked state,
   wherein rotation of the locking arm to transition the locking arm from the unlocked state to the locked state causes the second clamping surface of the second clamping member to advance toward the first clamping surface of the first clamping member,
   wherein in the locked state, the locking arm contacts the second clamping member at a contact point located between the pivot axis and the biasing portion,
   wherein the pivot axis is disposed at a location that is between a first end of the second clamping member and the biasing portion,
   wherein when the locking arm is in at least one position that is within the unlocked state, the second clamping surface of the second clamping member is spaced from the first clamping surface of the first clamping member via the biasing portion to define a gap into which an accessory can be received, and
   wherein when the locking arm is in the locked state, the second clamping member is retained at a position in which the second clamping surface is in close proximity to the first clamping surface such that the first and second clamping surfaces can cooperate to hold an accessory between the first and second clamping surfaces.

2. The device of claim 1, wherein the pivot axis is fixed relative to the first clamping member.

3. The device of claim 2, further comprising a pivot member coupled with the locking arm, wherein the pivot axis extends through the pivot member.

4. The device of claim 1, wherein the support structure is attached to the first clamping member, the support structure being coupled with the locking arm to permit the locking arm to rotate relative thereto.

5. The device of claim 4, wherein the first clamping member, the support structure, and the locking arm define a channel through which the second clamping member extends.

6. The device of claim 4, wherein the second clamping member is movable relative to the support structure.

7. The device of claim 6, wherein the second clamping member comprises an inner face and an outer face, wherein the inner face comprises the second clamping surface, and wherein the outer face interacts with a cam portion of the locking arm when the locking arm is rotated.

8. The device of claim 1, wherein the locking arm comprises a bistable configuration in which, when the locking arm is in either the locked state or at least one position in the unlocked state, forces acting on the locking arm are in equilibrium such that the locking arm does not rotate relative to the first clamping member.

9. The device of claim 1, wherein, when in the unlocked state, the locking arm passes through a range of rotational angles that define an idle zone and a range of rotational angles that define a work zone, wherein, when the locking arm passes through the idle zone, the locking arm is spaced from the second clamping member so as to not contact the second clamping member, and wherein, when the locking arm passes through the work zone, a portion of the locking arm contacts the second clamping member so as to urge the second clamping member toward the first clamping member.

10. The device of claim 9, wherein the portion of the locking arm that contacts the second clamping member when the locking arm is in the work zone comprises a cam configuration.

11. The device of claim 1, wherein the first clamping member comprises a first face and a second face that are directed in opposite directions, wherein the first face comprises the first clamping surface, and wherein the second face defines at least a portion of a channel into which an article of clothing may be received to secure the device to the article of clothing.

12. The device of claim 1, wherein the locking arm comprises a transverse protrusion that extends outwardly beyond a side edge of the second clamping member when the locking arm is in each of the unlocked and locked states.

13. The device of claim 1, wherein at least a portion of the first and second clamping surfaces touch each other when no accessory is positioned between the first and second clamping surfaces and the locking arm is in the locked state.

14. The device of claim 1, wherein the first and second clamping surfaces are at a first end of the device, the device further comprising an opening that extends through a second end of the device through which a fastener can be advanced for coupling the device to clothing or a body of a user.

15. An accessory fastening device comprising:
   a first clamping member comprising a first clamping surface;
   a second clamping member comprising a second clamping surface that faces the first clamping surface;
   a support structure comprising a pair of sides, wherein each side comprises an aperture through which a pivot axis extends,
   a locking arm that is rotatable about the pivot axis point to rotate between an unlocked state and a locked state;
   a biasing portion to bias at least a portion of the second clamping member away from the first clamping member;
   wherein rotation of the locking arm to transition the locking arm from the unlocked state to the locked state causes the second clamping surface of the second clamping member to advance toward the first clamping surface of the first clamping member;
   wherein when the locking arm is in at least one position that is within the unlocked state, the second clamping surface of the second clamping member is spaced from the first clamping surface of the first clamping member via the biasing portion to define a gap into which an accessory can be received;

wherein when the locking arm is in the locked state, the second clamping member is retained at a position in which the second clamping surface is in close proximity to the first clamping surface such that the first and second clamping surfaces can cooperate to hold an accessory between the first and second clamping surfaces;

wherein when the locking arm is in the locked state, the locking arm contacts the second clamping member at a contact point located between the pivot axis and the biasing portion to impart a rotational bias from the biasing member through the locking arm;

wherein the pivot axis is disposed at a location that is between a first end of the second clamping member and the biasing portion; and a clip member with an opening oriented in the same direction as the gap between the first clamping member and the second clamping member.

16. The device of claim 15, wherein the first clamping member comprises a first face and a second face that are directed in opposite directions, wherein the first face comprises the first clamping surface, and wherein the second face is directed toward the clip member.

17. The device of claim 15, wherein the first clamping member and the second clamping member are coupled to each other at a first end of the device, wherein the second clamping member is biased away from the first clamping member such that the second clamping surface is spaced from the first clamping surface at a second end of the device that is opposite from the first end of the device when the locking arm is in the unlocked state, and wherein the first clamping member and the clip member are coupled to each other at the first end of the device, and wherein the clip member is biased toward the first clamping member.

18. An accessory fastening device comprising:

a first clamping member comprising a first clamping surface;

a second clamping member comprising a second clamping surface that is configured to cooperate through a biasing connection with the first clamping surface to hold an accessory when the device is in a locked state, wherein the first and second clamping members are coupled to each other such that the second clamping member is biased away from the first clamping member when in an unlocked state; and a rotatable locking arm coupled with the first clamping member to rotate about a pivot axis between the locked state and the unlocked state, wherein rotation of the locking arm to transition the device from the unlocked state to a locked state effects movement of the second clamping member toward the first clamping member, wherein in the locked state the locking arm contacts the second clamping member at a contact point located between the pivot axis and the biasing connection, wherein the pivot axis is disposed at a location that is between a first end of the second clamping member and the biasing connection, and wherein the second clamping member is biased toward the first clamping member when in the locked state via a rotational force on the rotatable locking arm.

19. An accessory fastening device comprising:

a first clamping member comprising a first clamping surface;

a second clamping member comprising a second clamping surface; and a locking arm coupled with the first clamping member that is rotatable about a pivot axis between an unlocked state and a locked state, wherein when the locking arm is in at least one position that is within the unlocked state, the second clamping surface of the second clamping member is spaced from the first clamping surface of the first clamping member via a biasing portion, wherein when the locking arm is in the locked state, the second clamping member is retained at a position in which the second clamping surface is at least in close proximity to the first clamping surface such that the first and second clamping surfaces can cooperate to hold an accessory between the first and second clamping surfaces, wherein when in the unlocked state, the locking arm passes through a range of rotational angles that define an idle zone and a range of rotational angles that define a work zone, wherein when the locking arm passes through the idle zone, the locking arm is spaced from the second clamping member so as to not contact the second clamping member, wherein when the locking arm passes through the work zone, a portion of the locking arm contacts the second clamping member at a contact area between the pivot axis and the biasing portion so as to urge the second clamping member toward the first clamping member through a rotational force on the locking arm, and wherein the pivot axis is disposed at a location that is between a first end of the second clamping member and the biasing portion.

\* \* \* \* \*

UNITED STATES PATENT AND TRADEMARK OFFICE
CERTIFICATE OF CORRECTION

PATENT NO. : 9,949,558 B2
APPLICATION NO. : 14/473993
DATED : April 24, 2018
INVENTOR(S) : Scott McMurrin Reed Page 1 of 1

It is certified that error appears in the above-identified patent and that said Letters Patent is hereby corrected as shown below:

In the Claims

Column 14, Lines 52-53 read, ". . . the pivot axis point to rotate. . ." which should read, ". . . the pivot axis to rotate. . ."

Signed and Sealed this
Third Day of July, 2018

Andrei Iancu
*Director of the United States Patent and Trademark Office*